US012725381B2

(12) United States Patent
Chiosa

(10) Patent No.: US 12,725,381 B2
(45) Date of Patent: Sep. 1, 2026

(54) RELATIVE MIRRORING FOR SIMULTANEOUS ADJUSTMENT OF MULTIPLE TOOTH MODELS

(71) Applicant: EXOCAD GMBH, Darmstadt (DE)

(72) Inventor: Iurie Chiosa, Weiterstadt (DE)

(73) Assignee: EXOCAD GMBH, Darmstadt (DE)

( * ) Notice: Subject to any disclaimer, the term of this patent is extended or adjusted under 35 U.S.C. 154(b) by 164 days.

(21) Appl. No.: 18/746,184

(22) Filed: Jun. 18, 2024

(65) Prior Publication Data

US 2025/0384642 A1 Dec. 18, 2025

(51) Int. Cl.
*G06T 19/20* (2011.01)
*A61C 13/34* (2006.01)
*G06T 17/20* (2006.01)

(52) U.S. Cl.
CPC .............. *G06T 19/20* (2013.01); *A61C 13/34* (2013.01); *G06T 17/20* (2013.01); *G06T 2210/41* (2013.01); *G06T 2219/2004* (2013.01); *G06T 2219/2016* (2013.01); *G06T 2219/2021* (2013.01)

(58) Field of Classification Search
CPC . G06T 19/20; G06T 2219/2004; G06T 17/20; G06T 2207/30036; G06T 2219/2016; G06T 2219/2021; G06T 17/00; G06T 7/0016; G06F 30/00; A61C 13/34
See application file for complete search history.

(56) References Cited

U.S. PATENT DOCUMENTS

2012/0070803 A1 3/2012 Manai et al.
2015/0057983 A1* 2/2015 See .......................... G16B 5/00 703/1
2023/0008883 A1* 1/2023 Romanov ............ A61C 9/0046
2023/0035538 A1* 2/2023 Marshall .............. A61C 9/0053

FOREIGN PATENT DOCUMENTS

WO WO-2013053903 A1 4/2013

* cited by examiner

*Primary Examiner* — Hau H Nguyen
(74) *Attorney, Agent, or Firm* — Perry + Currier Inc.

(57) ABSTRACT

Disclosed is a computer-implemented method for adjusting an arrangement of a plurality of three-dimensional digital tooth models for a dental restoration. The method comprises selecting at least one of the three-dimensional digital tooth models, which is paired with a corresponding three-dimensional digital tooth model. A first calculation of a first adjustment of a geometric form of the selected tooth model is performed based on the second input defining a modification. The first adjustment is applied to the selected tooth model. A second calculation of a mapped adjustment of the geometric form of the paired corresponding tooth model is performed based on the second input or the first calculation. The mapped adjustment is based on a replica of the first adjustment adjusted relative to a local coordinate system of the paired corresponding tooth model and applied to the paired corresponding tooth model. The resulting adjusted three-dimensional digital denture model is provided for manufacturing.

20 Claims, 17 Drawing Sheets

RELATIVE MIRRORING FOR SIMULTANEOUS ADJUSTMENT OF MULTIPLE TOOTH MODELS

FIELD OF THE INVENTION

The invention relates to the field of dental technology. More particularly, the invention relates to a computer-implemented method for adjusting an arrangement of a plurality of three-dimensional digital tooth models for a dental restoration. The invention furthermore relates to a computer device and a computer program product for adjusting an arrangement of a plurality of three-dimensional digital tooth models for a dental restoration as well as a manufacturing system for manufacturing the dental restoration.

BACKGROUND

In modern dental technology, computer-based approaches are used for configuring and manufacturing dental restorations. For a dental restoration, e.g., an arrangement of a plurality of three-dimensional digital tooth models may have to be generated and adjusted using a computer. Adjusting an arrangement of a plurality of three-dimensional digital tooth models for a dental restoration may be a challenging and work-intensive task.

SUMMARY OF THE INVENTION

It is an objective to provide for a method, a computer device, and a computer program product for adjusting an arrangement of a plurality of three-dimensional digital tooth models for a dental restoration as well as for a manufacturing system for manufacturing the dental restoration. The objectives underlying the invention are solved by the features of the independent claims.

In one aspect, a computer-implemented method is disclosed for adjusting an arrangement of a plurality of three-dimensional digital tooth models for a dental restoration. The method comprises receiving a three-dimensional digital denture model comprising the plurality of the three-dimensional digital tooth models. The three-dimensional digital denture model defines the arrangement of the plurality of three-dimensional digital tooth models for the dental restoration. A first input is received selecting at least one of the three-dimensional digital tooth models. The selected three-dimensional digital tooth model is paired with a corresponding three-dimensional digital tooth model of the three-dimensional digital tooth models. A second input is received defining a modification of the selected tooth model. A first calculation is performed for calculating a first adjustment of a geometric form of the selected tooth model based on the second input, wherein the first adjustment is calculated according to a local coordinate system of the selected tooth model. The calculated first adjustment is applied to the selected tooth model. A second calculation is performed for calculating a mapped adjustment of the geometric form of the paired corresponding tooth model based on the second input or the first calculation, wherein the mapped adjustment is based on a replica of the first adjustment adjusted relative to a local coordinate system of the paired corresponding tooth model. The calculated mapped adjustment is applied to the paired corresponding tooth model. The resulting adjusted three-dimensional digital denture model is provided for manufacturing the dental restoration.

For instance, the three-dimensional digital denture model defines the arrangement of the plurality of three-dimensional digital tooth models such that the plurality of three-dimensional digital tooth models is aligned along a curved arch descriptive of a curved form of a ridge of a jaw. Aligning the plurality of three-dimensional digital tooth models may, e.g., be performed before receiving the three-dimensional digital denture model. The plurality of three-dimensional digital tooth models may, e.g., be provided in aligned form. For example, the three-dimensional digital tooth models may e.g., be library teeth provided in aligned form by a tooth library. Aligning the plurality of three-dimensional digital tooth models may, e.g., be performed before receiving the first input, or after pairing the selected three-dimensional digital tooth model with the corresponding three-dimensional digital tooth model.

The plurality of three-dimensional digital tooth models may, e.g., comprise tooth models of a maxilla and/or mandibula. The three-dimensional digital denture model may, e.g., comprise a maxilla and/or mandibula. The three-dimensional digital denture model, i.e., the plurality of three-dimensional digital tooth models may, e.g., be arranged on a three-dimensional digital tissue model of a patient. The three-dimensional digital tissue model may, e.g., be descriptive of a current state of a patient's intraoral tissue. The intraoral tissue may, e.g., comprise hard and/or soft tissue. Hard tissue may, e.g., comprise teeth, while soft tissue may, e.g., comprise gingiva tissue. The three-dimensional digital tissue model may comprise one or more jaws of the patient, i.e., a mandible and/or a maxilla. A jaw comprised by the three-dimensional digital tissue model may, e.g., be an edentulous jaw or a jaw comprising one or more teeth. The jaw may, e.g., comprise a full dental arch. This three-dimensional digital tissue model may, e.g., be provided using scan data of the intraoral tissue. The scan data of the intraoral tissue may, e.g., comprise optical scan data. The optical scan data may, e.g., comprise intraoral optical scan data or optical scan data from an optical scan of a classical mold/impression of the intraoral tissue. The optical scan data may, e.g., provide information about the surface structure of the patient's intraoral tissue.

The arranging of the three-dimensional digital tooth models on the three-dimensional digital tissue model may, e.g., comprise a segmenting of teeth comprised by the three-dimensional digital tissue model. The segmented teeth may, e.g., be replaced by the three-dimensional digital tooth models or overlaid with the three-dimensional digital tooth models. The three-dimensional digital tooth models may, e.g., be used to add teeth missing in the three-dimensional digital tissue model. The three-dimensional digital tooth models comprised by the three-dimensional digital denture model may, e.g., be provided using three-dimensional digital tooth models in form of library teeth provided by a tooth library. The three-dimensional digital tooth models comprised by the three-dimensional digital denture model may, e.g., be provided using scans of natural teeth or of physical tooth models. The three-dimensional digital tooth models comprised by the three-dimensional digital denture model may, e.g., be generated from scratch.

Examples may enable an applying of an adjustment not only to a single three-dimensional digital tooth model, i.e., the selected tooth model, but to more than one tooth model, e.g., to two tooth models. The adjustment is at least mapped to corresponding tooth model paired with the selected tooth model. For example, the selected tooth model may be paired with more than one other tooth model of the plurality of tooth models. The mapped adjustment is an adjustment of the paired tooth model, i.e., the paired corresponding tooth model, which is a replica of the first adjustment. This replica is adjusted relative to a local coordinate system of the paired corresponding tooth model, i.e., an orientation and/position of the mapped adjustment relative to the local coordinate system of the paired corresponding tooth model may, e.g., be identical to an orientation and/position of the adjustment being mapped relative to the local coordinate system of the selected tooth model. For example, one of the two local coordinate systems may be a right-handed coordinate system, while the other one may be a left-handed coordinate system. This may, e.g., be the case for a corresponding tooth model in form of a contralateral counterpart tooth model or an antagonist tooth model. For example, the two local coordinate systems may both be left-handed or both be right-handed coordinate systems.

Due to the mapped adjustment being a replica adjusted relative to a local coordinate system of the paired corresponding tooth model, a mapping of adjustments may be enabled even between tooth models that do not satisfy an exact global symmetry. For example, the plurality of three-dimensional digital tooth models may not satisfy an exact global symmetry. For example, the plurality of three-dimensional digital tooth models may not satisfy an exact global symmetry with respect to a mirror plane provided by a sagittal plane dividing the arrangement of the plurality of three-dimensional digital tooth models into two halves and/or provided by an occlusal plane. For example, the selected tooth model and the paired corresponding tooth model may not satisfy an exact global symmetry. For example, the selected tooth model and the paired corresponding tooth model may not satisfy an exact global symmetry with respect to a mirror plane provided by a sagittal plane dividing the arrangement of the plurality of three-dimensional digital tooth models into two halves and/or provided by an occlusal plane. For example, the adjustment applied to the selected tooth model and the mapped adjustment applied to the paired corresponding tooth model may not satisfy an exact global symmetry. For example, the adjustment applied to the selected tooth model and the mapped adjustment applied to the paired corresponding tooth model may not satisfy an exact global symmetry with respect to a mirror plane provided by a sagittal plane dividing the arrangement of the plurality of three-dimensional digital tooth models into two halves and/or provided by an occlusal plane.

Examples may, e.g., increase a flexibility and/or efficiency of adjusting an arrangement of three-dimensional digital tooth models due to the calculation and application of mapped adjustments that are adapted to the paired corresponding tooth model. The adjusted relative to a local coordinate system of the paired corresponding tooth model may result in an adaption to an individual position and/or orientation of the paired corresponding tooth model. Furthermore, an adaption to an individual geometric form of the paired corresponding tooth model may be enabled. Thus, a concurrent manual adjusting of the two tooth models may be avoided and instead a simultaneous adjustments of both models enabled.

Examples may have the beneficial effect that adjustments are determined, i.e., calculated, within local coordinate systems of the three-dimensional digital tooth models rather than in a global coordinate system. Thus, directions of adjustments from a global point of view may depend on the orientation of the individual three-dimensional digital tooth models. For example, to both the selected tooth model and the paired corresponding tooth model an adjustment in a buccal direction may be applied. In case the orientations of the selected tooth model and the paired corresponding tooth model are symmetric with respect to a global symmetry plane, e.g., a sagittal plane, arranged between the selected tooth model and the paired corresponding tooth model, the buccal directions and thus the adjustments may be symmetric with respect to the global symmetry plane. However, in case the orientations of the selected tooth model and the paired corresponding tooth model are not symmetric with respect to a global symmetry plane, the buccal directions and thus the adjustments may not be symmetric with respect to the global symmetry plane.

Thus, even in case of a non-symmetric arrangement of three-dimensional digital tooth models and/or a usage of non-symmetric three-dimensional digital tooth models, still an effective and efficient mapping of adjustments between tooth models may be enabled.

A local coordinate system of a tooth model, also referred to as local tooth frame herein, may, e.g., be any local coordinate system assigned to a tooth model. The local coordinate systems assigned to the tooth models may, e.g., be defined the same way relative to the respective individual tooth models using anatomical direction of the respective tooth models. This may, e.g., result in a switch of handiness for the local coordinate systems of tooth models of different hemispheres of a jaw or of different jaws.

When adjusting a tooth model, also the local coordinate system may be adjusted. For example, when moving and/or rotating a tooth model, the local coordinate system of the respective tooth model may be moved and/or rotated as well. Thus, position and/or orientation of the local coordinate systems of different tooth models may, e.g., differ from each other depending on differences of the position and/or orientation of the respective tooth models.

The local coordinate system of a tooth model may, e.g., be defined by anatomical tooth directions, i.e., axes. Anatomical tooth axes may be defined parallel to anatomical directions of the respective tooth model. Anatomical tooth axes and/or directions may be defined relative to anatomical sections of a tooth model. For example, anatomical sections of a tooth model may be defined the same way for all tooth models of the plurality of tooth models. For example, for each tooth model a buccal, a mesial and/or an occlusal anatomical section may be defined the same way. Thus, for each tooth model a buccal, a mesial and/or an occlusal axis and/or direction May be defined the same way. For example, the same local reference mesh shape defining these directions may be used for each of the tooth models of the plurality of tooth models. The tooth models may, e.g., be library teeth, for which the respective same local reference mesh shape is defined. Even if there is no such pre-defined alignment reference structure, like a mesh shape, anatomical tooth axes and/or directions may be determined. For example, in case tooth models are provided by scanning natural teeth or physical tooth models and segmenting the same, anatomical tooth axes and/or directions of the resulting three-dimensional tooth models may be determined and local coordinate frames assigned to the tooth models.

In reality, teeth of a dentition may neither be arranged, nor may they have forms satisfying an exact global symmetry, like a mirroring symmetry. Thus, in order to ensure a realistic and natural appearance of a denture model, tooth models comprised by the denture model may be arranged and/or may have forms not satisfying an exact global symmetry, like a mirroring symmetry. Example may allow for a mapping of any type of transformation, e.g., a translation, rotation, and/or scaling operation, and/or any type of deformation of a tooth model in a local tooth frame of the respective tooth model, i.e., the selected tooth model, to a local tooth frame of another tooth model, i.e., the paired corresponding tooth model. This corresponding tooth model may, e.g., be an opposite contralateral counterpart tooth arranged in a hemisphere of a jaw opposite to a hemisphere, in which the selected tooth model is arranged. The paired corresponding tooth model may, e.g., be an antagonist arranged on a jaw opposite to a jaw, in which the selected tooth model is arranged.

Examples may have the beneficial effect that a mapping, e.g., mirroring, may even be possible in case of an arrangement of the three-dimensional digital tooth models with no exact global symmetry, e.g., a quasi-symmetrical arrangement. As a result, a performing of any transformations and/or deformations of a selected tooth model with respect to the local coordinate system, i.e., local tooth frame, of the respective tooth model may easily be mirrored to the local coordinate system, i.e., local tooth frame, of the paired corresponding tooth model.

Examples may not only enable a mapping of transformations and/or deformations. In addition or alternatively, a smoothing and/or flattening may be applied to the selected tooth model and mapped onto the paired corresponding tooth model. In addition or alternatively, an adding and/or removing of material may be applied to the selected tooth model and mapped onto the paired corresponding tooth model.

Examples may also enable a mapping, e.g., mirroring, in case the selected tooth model and the paired corresponding tooth model have different scales. In case of a global exact symmetry between the selected tooth model and the paired corresponding tooth model, both models may be symmetrically scaled. However, in general the selected tooth model and the paired corresponding tooth model may not be symmetrically scaled. Different scales may, e.g., be caused by different requirements to be met by the respective tooth models. For example, the tooth models may be required to fit existing preparations, which may differ from each other. For example, an available space, in which the tooth models have to fit, may be different for both tooth models. Thus, the tooth models in general may not only be positioned and/or oriented, e.g., tilted, differently, but may also have different scales. Having different position refers to positions, which are not symmetric under an exact global symmetry. For example, the positions may not satisfy an exact global symmetry with respect to a mirror plane provided by a sagittal plane dividing the arrangement of the plurality of three-dimensional digital tooth models into two halves and/or provided by an occlusal plane. Having different orientations refers to orientations, which are not symmetric under an exact global symmetry. For example, the orientations may not satisfy an exact global symmetry with respect to a mirror plane provided by a sagittal plane dividing the arrangement of the plurality of three-dimensional digital tooth models into two halves and/or provided by an occlusal plane.

Working in the local tooth frames for calculating and applying adjustments rather than a global frame may allow to apply, e.g., deformations, also on differently scaled frames. The local coordinate systems may, e.g., be assigned with different units of length. For example, a deformation by one unit of length of one local coordinate system may differ in size by from a deformation by one unit of length of another local coordinate system. Example may allow for a relative mirroring of the adjustment from the selected tooth model to the paired corresponding tooth model performing, e.g., also a relative scaling. Examples may allow for performing any deformation on different scaled local tooth frames.

Examples may also be useful for tooth libraries, in case the respective teeth are not symmetrical by default, e.g., not symmetrical in shape. Examples may give more flexibility to a user, like a dentist or dental technician, to design individualized configurations of tooth models, which may be better suited for a patient's needs, in a faster way.

For example, a digital tool may be used to provide the second input, i.e., the modification of the selected tooth model. The digital tool may be displayed on a graphical user interface together with the three-dimensional digital denture model. The digital tool may be controlled by a user of a computer device comprising a display, on which the graphical user interface is displayed. The digital tool may be controlled to provide an input defining the modification of the selected tooth model, e.g., type, size, position, and/or orientation of the modification. The digital tool may be used to indicate which type of modification, e.g., deforming, smoothing, and/or adding or removing of material, to be applied to the selected tooth model. This digital tool itself may also be mapped, e.g., mirrored, from one local tooth frame to another, i.e., from the local coordinate system of the selected tooth model to the local coordinate frame of the paired corresponding tooth model. Thus, the digital tool may be displayed in addition for the paired corresponding tooth model relative to the local coordinate system of the same. A given operation in the local coordinate system of the selected tooth model may, e.g., be apply directly to a mesh forming the paired corresponding tooth model in the local coordinate system of the paired corresponding tooth model. The operation being apply directly to the mesh forming the paired corresponding tooth model may be adjusted relative to the local coordinate system of the paired corresponding tooth model, when being applied.

Examples may enable to not only work with tooth models, e.g. meshes, of different size, but also with tooth models, e.g. meshes, of different shapes. For example, the meshes may be meshes of different types. For example, the meshes may have different resolutions. For example, the tooth models may be tooth models from different libraries.

According to example, the mapped adjustment of the paired corresponding tooth model may be adjusted and thus performed with respect to a local tooth frame of the respective corresponding tooth model itself. According to examples intersections may be identified, e.g., using a ray intersection, in order to determine a position of an adjustment to be applied relative to a local coordinate system. For determining the intersections, e.g., unscaled local coordinate systems may be used, i.e., coordinate systems using identical units of length. In case the two tooth models are assigned with different tooth scales, the paired corresponding tooth model may, e.g., be scaled to a scale identical with a scale of the selected tooth model. The adjustment may be mapped and applied to the scaled corresponding tooth model and the resulting in a preliminary adjusted corresponding tooth model scaled back to its original scale, in order to determine the final adjusted corresponding tooth model.

According to examples, exact scale local tooth frames may be imposed. For example, tooth proportion, i.e., a tooth scale, may be mirrored exactly from the selected tooth model to the paired corresponding tooth model. As a result, both tooth models, i.e., the selected tooth model and the paired corresponding tooth model, may have the same scale.

But the two tooth models may still differ, e.g., in position and/or orientation, i.e., position and/or orientation may not be mirrored.

According to example, the mirroring may be applied selectively to tooth alignment, i.e., orientation, position, shape, and/or scale only.

For example, the local tooth frames and thus the tooth models may be aligned along an arch bow, e.g., in a spline-like form. For example, symmetrical mirroring may only be applied relative to the aligned local tooth frame, i.e., the tooth models may remain symmetrical in their local tooth frame.

According to examples, also an exact global symmetry may be achievable, e.g., by implementing an exact alignment of the local tooth frames of three-dimensional tooth models with exact symmetrical tooth shapes. As a result, an exact global symmetry may be a borderline case of examples. This means, an exact global symmetry may be achievable by examples, but examples are not limited to an exact global symmetry.

For example, an exact alignment of local tooth frames may be implemented for three-dimensional tooth models without exact symmetrical tooth shapes. Thus, positions, orientations and/or scales of the three-dimensional tooth models may be symmetrical, but no exact global symmetry may be implemented.

For example, when calculating the first adjustment of the geometric form of the selected tooth model and/or when calculating the mapped adjustment of the geometric form of the paired corresponding tooth model, instant anatomic tooth morphing may be implemented. Instant anatomic tooth morphing may ensure that adjustments of the geometric tooth forms being calculated are adjusted, e.g., in real-time, to anatomical limitations defined by other tooth models, e.g., by antagonistic tooth models, antagonist scan models, and/or approximal tooth models. To fulfil imposed anatomical limitations defined by other tooth models, tooth deformation and/or tooth feature deformation may be applied to resolve one or more intersections of the selected and/or paired corresponding tooth model with one or more of the other tooth models defining the anatomical limitations. In addition, e.g., tooth abrasion of the selected and/or paired corresponding tooth model may be changed, e.g., in the above-described local frame manner. The local frame manner may, e.g., use a relative or an exact mirroring. The instant anatomic tooth morphing may, e.g., be implemented with or without grouping the plurality of tooth models as a chain-like assembly with a fixed relative arrangement of approximal tooth models.

For example, the second calculation is based on the second input. The calculated first adjustment and the calculated mapped adjustment may, e.g., be applied simultaneously.

Additionally or alternatively, the calculated first adjustment and the calculated mapped adjustment may, e.g., be computed simultaneously.

Examples may, e.g., enable a real-time update of the modification of the paired corresponding tooth model which may improve the interaction between the user and the computer-implemented method, e.g., due to an immediate visual feedback. In particular, a simultaneous adjustment of two or more tooth models may be implemented.

For example, the selected tooth model is a model of a specific dental type. The paired corresponding tooth model may, e.g., be a model of the same specific dental type as the selected tooth model. The specific dental type may, e.g., be one of the following: incisors, canines, premolars, and molars. The same specific dental type of the selected tooth model and the corresponding tooth model may, e.g., be the same specific dental type of the same jaw, i.e., the same specific maxillary dental type or the same specific mandibular dental type. The same specific dental type of the selected tooth model and the corresponding tooth model may, e.g., the same specific dental type of opposite jaws, i.e., one of the paired tooth models may be a maxillary model of a specific dental type, while the other one may be a mandibular model of the same specific dental type.

The same specific dental type of the selected tooth model and the corresponding tooth model may, e.g., the same specific dental type of different hemispheres. The same specific dental type of the selected tooth model and the corresponding tooth model may, e.g., the same specific dental type of the same hemisphere, e.g., the two incisors, the two premolars, or two molars of the same hemisphere.

For example, the paired corresponding tooth model may, e.g., be a model of a different specific dental type as the selected tooth model. The specific dental type of the paired corresponding tooth model may, e.g., be one of the following: incisors, canines, premolars, and molars; while the specific dental type of the selected tooth model may, e.g., be a different one of the following: incisors, canines, premolars, and molars. Thus, e.g., a canine may be paired with a premolar or an incisor. The different specific dental types of the paired tooth models may, e.g., be different specific dental type of the same jaw, i.e., different specific dental type of maxillary teeth or different specific dental type of mandibular teeth. The different specific dental types of the paired tooth models may, e.g., be different specific dental types of opposite jaws, i.e., one of the paired tooth models may be a maxillary model of a specific dental type, while the other one may be a mandibular model of a different specific dental type.

The different specific dental type of the selected tooth model and the corresponding tooth model may, e.g., different specific dental type of different hemispheres. The different specific dental type of the selected tooth model and the corresponding tooth model may, e.g., different specific dental type of the same hemisphere.

Examples may, e.g., may enable an adjustment of tooth of the same type in a similar way. Thus, a homogeneity and/or symmetricity of an appearances of the denture may be increased, without a requirement for implementing an exact global symmetry. Examples may, e.g., increase the specificity and accuracy of adjusting the arrangement of digital tooth models, since each dental type has unique anatomical features that are crucial for achieving an optimal restoration that meets biomechanical and/or aesthetical requirements defined for the restoration, especially with respect to a symmetry between tooth models. Therefore, by ensuring that the selected tooth model and the paired corresponding tooth model are models of the same dental type, the degree of symmetry between these models may be increased, when mapped adjustments are calculated and applied to the paired corresponding tooth model.

For example, the paired corresponding tooth model is a contralateral counterpart of the selected tooth model. For example, the paired tooth models may be the first incisors, i.e., 11 and 21 according to FDI notation. For example, the paired tooth models may be the second incisors, i.e., 12 and 22 according to FDI notation. For example, the paired tooth models may be canines, i.e., 13 and 23 according to FDI notation. For example, the paired tooth models may be the first premolars, i.e., 14 and 24 according to FDI notation. For example, the paired tooth models may be the second premolars, i.e., 15 and 25 according to FDI notation. For example, the paired tooth models may be the first molars, i.e., 16 and 26 according to FDI notation. For example, the paired tooth models may be the second molars, i.e., 17 and 27 according to FDI notation. For example, the paired tooth models may be the third molars, i.e., 18 and 28 according to FDI notation.

Example may, e.g., ensure, that adjustments are applied to both tooth models of contralateral counterpart pairs. Thus, a homogeneity and/or symmetricity of an appearances of these contralateral counterpart tooth models may be increased, without a requirement for implementing an exact global symmetry. Examples may, e.g., improve the efficiency of adjusting the arrangement of digital tooth models. For example, a similarity between contralateral counterpart tooth models, which may be desired for aesthetical and/or biomechanical reasons, may be achieved faster.

For example, the paired corresponding tooth model is an antagonist of the selected tooth model. Thus, the paired tooth models may be identical teeth from opposite jaws, i.e., antagonists. Alternatively, the paired tooth models may be different types of teeth from opposite jaws.

Example may, e.g., ensure, that adjustments are applied to both tooth models of antagonistic counterpart pairs. Thus, a homogeneity and/or symmetricity of an appearances of these antagonistic counterpart tooth models may be increased, without a requirement for implementing an exact global symmetry. Examples may, e.g., improve the efficiency of adjusting the arrangement of digital tooth models. For example, a similarity between antagonistic counterpart tooth models, which may be desired for aesthetical and/or biomechanical reasons, may be achieved faster.

For example, the local coordinate systems of the selected tooth model and of the paired corresponding tooth model are orthogonal coordinate systems. The coordinate systems may, e.g., be defined by respective axes corresponding to mesial, buccal, and occlusal directions of the tooth models. For instance, the origins of the local coordinate systems of the digital tooth models may be anchored at a spatial point of the respective digital tooth model, e.g., the centroid.

The orthogonal coordinate systems may, e.g., be a coordinate system using Cartesian coordinates. However, also other types of orthogonal coordinates may be used instead, like, e.g., cylindrical polar coordinates or spherical coordinates.

A Cartesian coordinate system for a three-dimensional space consists of an ordered triplet of lines, i.e., axes, which go through a common point, referred to as the origin, and are pair-wise perpendicular. A Cartesian coordinate system may describe an orientation for each axis as well as a single unit of length for all three axes. The orientations of the three orthogonal axes of the local coordinate system may, e.g., correspond to anatomical directions of a three-dimensional digital tooth model. For example, a first axis is an axis oriented along a buccal direction of the tooth model. A second axis may, e.g., be an axis oriented along a mesial direction of the tooth model and a third axis may, e.g., be an axis oriented along an occlusal direction of the tooth model. For sake of simplicity, the term buccal herein may be used independently of the type of tooth described by the tooth model, i.e., posterior teeth as well as anterior teeth. In other words, it is used as a synonym for vestibular and may actually refer to a buccal as well as a labial direction. For sake of simplicity, the term occlusal is used independently of the type of tooth described by the tooth model, i.e., posterior teeth as well as anterior teeth and generally refers to a coronal direction of the respective tooth. In other words, in case of anterior teeth it is used as a synonym for incisal. The mesial direction refers to a direction toward an anterior midline in a dental arch. Thus, for two adjacent incisors arranged on opposite sides of the anterior midline, the individual mesial directions may be opposite directions depending on the exact orientation of the respective tooth. This may, e.g., result in local coordinate systems with different handiness. For example, one of the local coordinate systems of two paired tooth models arranged on different hemispheres of the same jaw or on different jaws may be a left-handed coordinate system, while the other local coordinate system may be a right-handed coordinate system.

The actual orientation of the axes of the local coordinate systems from a global point of view may differ depending on an orientation of the respective tooth models, they are assigned to. Since the local coordinate systems are assigned to the tooth models with a fixed relative orientation, their orientations may change with the orientations of the tooth models, they are assigned to. Therefore, they are referred to as local coordinate systems.

Examples may, e.g., decrease the resources needed for the calculations of adjustments, since orthogonal coordinate systems simplify the geometric transformations required for adjusting the geometric forms of the tooth models, thereby reducing computational complexity and time. Furthermore, users in the field of dental technology are familiar with anatomic directions of teeth, like mesial, buccal, and occlusal directions of the tooth models. Thus, using such anatomic directions of teeth for defining the orthogonal coordinate systems may facilitate an integration of the method into existing infrastructure.

For example, the first adjustment and the mapped adjustment include one or more of the following types of adjustment: translation, rotation, scaling, deformation, and altering of a surface topology.

Examples may, e.g., increase the flexibility of the dental restorations by allowing for detailed adjustments to each tooth model's position, orientation, size, shape, and/or morphology.

A translation refers to a translational movement of the respective tooth model in a direction defined relative to the local coordinate system of the respective tooth model. A mapped translation may, e.g., be a replica of the aforementioned translational movement, but executed in a direction defined the same way relative to the local coordinate system of the paired corresponding tooth model as the aforementioned translational movement has been defined relative to the local coordinate system of the selected tooth.

A rotation refers to a rotational movement of the respective tooth model around a rotational axis arranged along a direction defined relative to the local coordinate system of the respective tooth model. A mapped rotation may, e.g., be a replica of the aforementioned rotational movement, but executed around an axis of rotation arranged along a direction defined the same way relative to the local coordinate system of the paired corresponding tooth model as the aforementioned rotational movement has been defined relative to the local coordinate system of the selected tooth. In case of a rotation, the direction of rotation may change with the handiness of the local coordinate system.

A scaling refers to a change of size of a tooth model. The change of size may be executed relative to a starting size of a tooth model. Thus, a tooth model being scaled by X % of the starting size. The scaling may be an increasing or a decreasing of the size, e.g., by X %.

A deformation refers to a modification of a geometric form of the respective tooth model. This deformation may comprise modification in one or more directions defined relative to the local coordinate system of the respective tooth model. A mapped deformation may be a replica of the aforementioned deformation, but executed in one or more directions defined the same way relative to the local coordinate system of the paired corresponding tooth model as the aforementioned deformation has been defined relative to the local coordinate system of the selected tooth.

An altering of a surface topology may alter the appearance of a surface structure of the respective tooth model. This altering may be executed on a surface section and/or structure defined relative to the local coordinate system of the respective tooth model. A mapped altering of a surface topology may be a replica of the aforementioned altering, but executed on a surface section and/or structure defined the same way relative to the local coordinate system of the paired corresponding tooth model as the surface section and/or structure of the aforementioned altering has been defined relative to the local coordinate system of the selected tooth.

For example, calculating the mapped adjustment involves determining a corresponding point on a surface of the paired corresponding tooth model that correlates to a first point on a surface of the selected tooth model, where the first adjustment is to be applied. The mapped adjustment is applied at the corresponding point. For instance, the surface of the three-dimensional digital tooth models may be defined as the boundary that delineates the tooth models internal volume from the surrounding space.

Examples may enable a determining of one or more corresponding points on a surface of the paired corresponding tooth model, where to apply the mapped adjustment. Examples may, e.g., increase flexibility and reliability of adjusting the arrangement of digital tooth models, because it may be ensured that even when tooth models vary in size, form and/or surface topology, mapped adjustments may still be calculated and applied to the corresponding tooth.

For example, determining the corresponding point may involve a computational technique selected from a group comprising: a ray intersection, a closest point determination, an interpolation, a surface mapping algorithm, and a three-dimensional coordinate transformation.

Examples may, e.g., enable an effective and/or efficient determining of one or more corresponding points on a surface of the paired corresponding tooth model, where to apply the mapped adjustment. Directions used for the respective computational techniques, e.g., directions of rays, may be determined by mapping a relative orientation of the respective directions, e.g., rays, from the local coordinate system of the selected tooth model to an identical orientation relative to the local coordinate system of the paired corresponding tooth model. In case the orientations of the local coordinate systems relative to each other are identical, also the orientation of the respective directions relative to each other will be identical. However, in general the orientations of the local coordinate systems relative to each other may not be identical, thus also the orientation of the respective directions relative to each other will not be identical from a global point of view.

Also, a determining of positions of one or more reference points, as, e.g., used for a closest point determination, an interpolation, and/or a surface mapping algorithm may, e.g., comprise a determining of positions one or more reference points on the surface of the selected tooth model and identify the same positions on the surface of the paired corresponding tooth model. The definition of a position with respect to the local coordinate system of the selected tooth model may be identical with a definition of the corresponding position relative to the local coordinate system of the paired corresponding tooth model.

For example, the second input defines a geometric shape. The geometric shape has an orientation and a spatial position in relation to the local coordinate system of the selected tooth model. The second input further defines a modification of the topology within a designated zone of the selected tooth model's surface. The designated zone is defined by the geometric shape. The first point is inside the designated zone. The determining of the corresponding point is based on adjusting the orientation and the spatial position of the geometric shape relative to the coordinate system of the paired corresponding tooth model. For instance, the functionalities of defining a geometric shape, having an orientation and a spatial position in relation to the local coordinate system of the selected tooth model, defining a modification of the topology, and/or defining the designated zone by the geometric shape, may be provided by a digital tool. For instance, the geometric shape may be a geometric shape of the digital tool. For example, the geometric shape may be a dome, a flat disc, e.g., a flat and/or tangential and/or perpendicular disc, a plane, or a combination of the aforementioned.

Examples may, e.g., increase the flexibility and reliability of adjusting the arrangement of digital tooth models, because it may be ensured that the corresponding point is accurately determined despite variations in size and/or shape of the paired corresponding tooth model compared to the selected tooth model. Thus, a fit and/or function of the dental restoration may be enhanced. For instance, if the selected tooth model comprises a cusp which the paired corresponding tooth model does not comprise, a smoothing the surface of the cusp would also be mapped to a corresponding area on the paired corresponding tooth model, even if it initially lacks a similar feature.

For example, the geometric forms are defined by meshes. The adjustments of the geometric forms of the tooth models may involve modifications of at least one vertex, edge, and/or face of the respective meshes. For instance, the first point and the corresponding point may be vertices of the meshes.

The meshes may, e.g., be polygon meshes. A polygon mesh refers to a collection of vertices, edges and faces that defines a shape of a polyhedral object. The faces may, e.g., comprise triangles, quadrilaterals, or other n-gons.

Examples may, e.g., increase a precision and/or efficiency of adjusting the arrangement of digital tooth models, as mesh-level adjustments can increase accuracy, while reducing computational complexity and time.

For example, the geometric forms may be defined by point clouds. The adjustments of the geometric forms of the tooth models may involve changing the position of at least one point of the respective point cloud. For instance, the first point and the corresponding point may be comprised by the point clouds.

A point cloud refers to a discrete set of data points in space, e.g., in three-dimensional space. The points may represent a three-dimensional shape or object. Each point position corresponds to a set of coordinates, e.g., a set of Cartesian coordinates [X, Y, Z]. Examples may, e.g., increase the level of detail of the tooth models. Thereby a precision with which the tooth models can be adjusted may be enhanced.

For example, the scale of the paired corresponding tooth model is adjusted to match the scale of the selected tooth model before the second calculation is performed. Matching the scale of the selected tooth model refers to matching the size of the selected tooth model. For example, the paired corresponding tooth model may be inflated or deflated, until its size matches the size of the selected tooth model. The scaling of the paired corresponding tooth model may start with a starting size of the paired corresponding tooth model, scaling the paired corresponding tooth model by a scaling factor. The scaling factor may, e.g., be a scaling factor larger than resulting in an increasing of the size of the paired corresponding tooth model. The scaling factor may, e.g., be a scaling factor lower than one resulting in a decreasing of the size of the paired corresponding tooth model. Furthermore, the calculated mapped adjustment may, e.g., be applied to the scaled corresponding tooth model. For example, the scaled size of the paired corresponding tooth model may be maintained after applying the mapped adjustment. For example, the paired corresponding tooth model may be scaled back after applying the mapped adjustment using an inverse of the scaling factor used before for scaling the paired corresponding tooth model.

Examples may, e.g., increase the flexibility of adjusting the arrangement of digital tooth models by ensuring that both adjusted tooth models are scaled equally without other properties such as surface topology, spatial position and/or orientation being mirrored. For instance, alternatively or additionally to the scale or size another property which defines a geometric form of the paired corresponding tooth model, such as a position, orientation, surface topology, shape, and/or a combination thereof, may be adjusted to match a respective property of the selected tooth model. This may further increase the flexibility of adjusting the arrangement of digital tooth models, since the user may focus on at least one property of the tooth model's geometric form to be adjusted in a way relative to the local coordinate system of the paired corresponding tooth model, while other properties are adjusted in a way that resembles an exact mirroring. For instance, this may be helpful when a user desires a selected tooth model and a contralateral corresponding tooth model having the same size and orientation but different positions, while only the selected model's deformations and alterations of the surface topology are mapped to the paired corresponding tooth model comprising an adjustment to the local coordinate frame of the paired corresponding tooth model. For instance, this may be helpful when a user desires a selected tooth model and a contralateral corresponding tooth model having the same size and position but different orientations, while only the selected model's deformations and alterations of the surface topology are mapped to the paired corresponding tooth model comprising an adjustment to the local coordinate frame of the paired corresponding tooth model.

For example, the method further comprises for a set of three-dimensional tooth models, which comprises the selected tooth model, the paired corresponding tooth model and remaining three-dimensional tooth models of the plurality of three-dimensional digital tooth models, performing a third calculation of set adjustments of the geometric forms of the remaining three-dimensional digital tooth models, wherein the set adjustments are calculated based on the first and the second calculation. The calculated set adjustments are applied to the remaining tooth models.

In particular, the set adjustments may, e.g., be calculated in a way that the remaining tooth models react in a chain-like manner to modifications applied to the selected tooth model and the paired corresponding tooth model. For instance, a translation of the selected tooth model along a curved arch descriptive of the curved form of a ridge of a jaw may result in calculated set adjustments, which propagate the translation to the remaining three-dimensional digital tooth models in a way that a predefined relative distance between the selected tooth model, the paired corresponding tooth model and the remaining digital tooth models is preserved. For instance, a modification of the selected tooth model along the curved arch may result in calculated set adjustments, which propagate the translation to the remaining three-dimensional digital tooth models in a way that an arrangement of the selected tooth model, the paired corresponding tooth model and the remaining digital tooth models on the curved arch is preserved.

For instance, a transformation of the selected tooth model, which may, e.g., comprise a translation, a scaling, and/or a rotation, may result in calculated set adjustments, which propagate the transformation to the remaining three-dimensional digital tooth models in a way that a predefined relative distance and/or orientation between the selected tooth model, the paired corresponding tooth model and the remaining digital tooth models is preserved. For instance, a transformation of the selected tooth model may result in calculated set adjustments, which propagate the transformation to the remaining three-dimensional digital tooth models in a way that an arrangement of the selected tooth model, the paired corresponding tooth model and the remaining digital tooth models on the curved arch is preserved.

Examples may, e.g., ensure that the geometric form of the remaining tooth models is correct with respect to their positions along the curve arch descriptive of the curved form of a ridge of a jaw arch as well as relative to the geometric forms of the selected and the corresponding three-dimensional digital tooth model. Furthermore, adjusting the arrangement of digital tooth models may be simplify by reducing the need for isolated adjustments on each tooth model. Thus, efficiency may be increased and/or a risk of errors due to manual inputs may be reduced.

For example, a set choosing input may be received before the first input. The set choosing input may define the set of three-dimensional digital tooth models. Examples may, e.g., enable a flexible selection of three-dimensional digital tooth models to be comprised by the set of three-dimensional digital tooth models.

Examples may, e.g., increase a flexibility and/or efficiency of adjusting the arrangement of digital tooth models, since a user may be enabled to choose upfront, which tooth models of the denture model are to be adjusted, and therefore to focus on the chosen ones. This may also reduce computational complexity and time, since the number of remaining tooth models for which set adjustments have to be calculated may be reduced.

For example, a deactivating input may be received. The deactivating input deactivates one of the remaining tooth models. The set adjustments may not be calculated for the deactivated remaining tooth models. The third calculation may also be based on a geometric form of the deactivated remaining tooth model. Thus, the geometric form of the deactivated remaining tooth model may be unchanged. Still, the geometric form of the deactivated tooth models may be taken into account, when calculating the set adjustments for the non-deactivated tooth models, in particular with respect to the chain-like manner in which the non-deactivated remaining tooth models behave. For instance, all tooth models may be selected as the set of tooth models by the set choosing input. For example, the selected tooth model may be a model of a premolar dental type and the paired corresponding tooth model may be a contralateral counterpart of the selected tooth model. In such a scenario, the deactivation of a tooth model of a canine type may, e.g., result in adjustments applied to the premolar models not impacting the geometric form of the deactivated canine model. Still its geometric form may add a constraint to calculating the set adjustments. As a result, e.g., the radius and/or the length of a curve or curved arch, to which the digital tooth models are aligned, may be changed in order to preserve a predefined distance between the selected tooth model, the paired corresponding tooth model, and the remaining digital tooth models.

For example, the method further comprises pairing the selected digital tooth model also with an additional three-dimensional digital tooth model of the three-dimensional digital tooth models, i.e., another corresponding three-dimensional digital tooth model, performing a fourth calculation of an additional mapped adjustment of a geometric form of the additional tooth model based on the second input or the first calculation. The additional mapped adjustment is based on an additional replica of the first adjustment adjusted relative to the local coordinate system of the additional tooth model. The calculated additional mapped adjustment is applied to the additional tooth model.

For example, a selected digital tooth model of a premolar may be paired with two opposite or two contralateral premolars. For example, a selected digital tooth model of a premolar may be paired with an opposite and a contralateral premolar. For example, a selected digital tooth model of a molar may be paired with two opposite or two contralateral molars. For example, a selected digital tooth model of a molar may be paired with an opposite and a contralateral molar. For example, a selected digital tooth model of an incisor may be paired with two opposite or two contralateral incisors. For example, a selected digital tooth model of an incisor may be paired with an opposite and a contralateral incisor.

Examples may, e.g., increase a flexibility and efficiency of adjusting the arrangement of digital tooth models, since modifications of the selected tooth model may be adaptively mapped to a plurality of tooth models, namely the paired corresponding tooth model and at least one additional tooth model, which may also reduce the risk of errors due to concurrent manual inputs.

For example, the paired corresponding tooth model is a mirrored replica of the selected tooth model. The mirroring may, e.g., be performed with respect to a mirror plane provided by a sagittal plane dividing the arrangement of the plurality of three-dimensional digital tooth models into two halves or provided by an occlusal plane.

Examples may, e.g., enable an applying of an adjustment to the selected tooth model and a mapped adjustment to the paired corresponding tooth model, which satisfy a mirror symmetry with respect to the mirror plane provided by a sagittal plane dividing the arrangement of the plurality of three-dimensional digital tooth models into two halves and/or provided by the occlusal plane.

Examples may, e.g., increase an efficiency of adjusting the arrangement of digital tooth models by providing an exact symmetry in form of a mirror symmetry, which in turn may, e.g., be desired for aesthetical and/or biomechanical reasons.

With the paired corresponding tooth model being a mirrored replica of the selected tooth model, the selected tooth model and the paired corresponding tooth model may satisfy a mirror symmetry. For example, the selected tooth model and the paired corresponding tooth model may satisfy the mirror symmetry with respect to the mirror plane provided by a sagittal plane dividing the arrangement of the plurality of three-dimensional digital tooth models into two halves and/or provided by the occlusal plane.

With the selected tooth model and the paired corresponding tooth model satisfying the mirror symmetry, also the adjustment applied to the selected tooth model and the mapped adjustment applied to the paired corresponding tooth model may satisfy the mirror symmetry. For example, the adjustment applied to the selected tooth model and the mapped adjustment applied to the paired corresponding tooth model may satisfy the mirror symmetry with respect to a mirror plane provided by a sagittal plane dividing the arrangement of the plurality of three-dimensional digital tooth models into two halves and/or provided by an occlusal plane.

The adjustments are applied relative to the local coordinate systems, which have a fixed spatial relation to the tooth models. With the tooth models satisfying the mirror symmetry, also the local coordinate systems may satisfy the mirror symmetry. With the local coordinate systems satisfying the mirror symmetry, also the adjustments may satisfy the mirror symmetry.

For example, also other pairs of three-dimensional digital tooth models of the plurality of three-dimensional digital tooth models may satisfy the mirror symmetry. For example, the plurality of three-dimensional digital tooth models may satisfy the mirror symmetry. For example, the plurality of three-dimensional digital tooth models may satisfy the mirror symmetry with respect to the mirror plane provided by a sagittal plane dividing the arrangement of the plurality of three-dimensional digital tooth models into two halves and/or provided by the occlusal plane.

For example, the selected tooth model and the paired corresponding tooth model may not satisfy a mirror symmetry. For example, the selected tooth model and the paired corresponding tooth model may not satisfy a mirror symmetry with respect to a mirror plane provided by a sagittal plane dividing the arrangement of the plurality of three-dimensional digital tooth models into two halves and/or provided by an occlusal plane.

For example, the local coordinate system of the paired corresponding tooth model and the local coordinate system of the selected tooth model satisfy a mirror symmetry with respect to the mirror plane provided by the sagittal plane dividing the arrangement of the plurality of three-dimensional digital tooth models into two halves or provided by the occlusal plane. With the local coordinate systems satisfying the mirror symmetry, e.g., also the adjustments may satisfy the mirror symmetry. The tooth models may be bound to their local coordinate systems. These bounded tooth models may, e.g., be identical in case or paired tooth models or may be different. The different tooth models may even be different tooth models, e.g., from different tooth libraries.

For example, selectively only one of the following features of the local coordinate system of the paired corresponding tooth model and the local coordinate system of the selected tooth model satisfying the mirror symmetry with respect to the mirror plane provided by the sagittal plane dividing the arrangement of the plurality of three-dimensional digital tooth models into two halves or provided by the occlusal plane: a scale, a position, an orientation.

Thus, e.g., only a scale, a position, or an orientation of the two local coordinate systems may satisfy the mirror symmetry. Thus, adjustments may satisfy the mirror symmetry, e.g., only with respect to their scales, their positions, or their orientations.

For example, a trained machine learning module may be used for generating the three-dimensional digital denture model. For generating the three-dimensional digital denture model, the trained machine learning module may, e.g., use a three-dimensional digital tissue model of a patient's intraoral tissue. The three-dimensional digital tissue may, e.g., be provided using scan data of the dental cavity of the patient. The three-dimensional digital denture model may be received as output from the trained machine learning module in response to providing the three-dimensional digital tissue model as input.

For example, the trained machine learning module may be provided. The trained machine learning module being provided may be trained to provide the three-dimensional digital denture model as output in response to receiving the three-dimensional digital tissue model as input.

For example, the providing of the trained machine learning module may comprise providing a machine learning module to be trained. Training datasets may be provided for training the machine learning module to be trained. For example, each training dataset may comprise a three-dimensional digital training tissue model as well as a three-dimensional digital training denture model. The machine learning module to be trained may be trained to provide the three-dimensional digital training denture models of the training datasets as an output in response to receiving the three-dimensional digital training tissue models of the respective training datasets as input.

For example, a trained machine learning module may be used for generating one or more of the three-dimensional digital tooth models of the three-dimensional denture model. For generating the one or more three-dimensional digital tooth models, the trained machine learning module may, e.g., use a three-dimensional digital tissue model of a patient's intraoral tissue. The three-dimensional digital tissue may, e.g., be provided using scan data of the dental cavity of the patient. The one or more three-dimensional digital tooth models may be received as output from the trained machine learning module in response to providing the three-dimensional digital tissue model as input.

For example, the trained machine learning module may be provided. The trained machine learning module being provided may be trained to provide the one or more three-dimensional digital tooth models as output in response to receiving the three-dimensional digital tissue model as input.

For example, the providing of the trained machine learning module may comprise providing a machine learning module to be trained. Training datasets may be provided for training the machine learning module to be trained. For example, each training dataset may comprise a three-dimensional digital training tissue model as well as one or more three-dimensional digital training tooth models. The machine learning module to be trained may be trained to provide the one or more three-dimensional digital training tooth models of the training datasets as an output in response to receiving the three-dimensional digital training tissue models of the respective training datasets as input.

For example, a trained machine learning module may be used for assigning three-dimensional digital tooth models with local coordinate systems. A three-dimensional digital denture model assigned with a local coordinate system may be received as output from the trained machine learning module in response to providing the three-dimensional digital tooth model as input.

For example, the trained machine learning module may be provided. The trained machine learning module being provided may be trained to provide the three-dimensional digital denture model assigned with a local coordinate system as output in response to receiving the three-dimensional digital tooth model as input.

For example, the providing of the trained machine learning module may comprise providing a machine learning module to be trained. Training datasets may be provided for training the machine learning module to be trained. For example, each training dataset may comprise a three-dimensional digital training tooth model as well as a local coordinate system assigned to the three-dimensional digital training tooth model. The machine learning module to be trained may be trained to provide the local coordinate systems assigned to the three-dimensional digital training tooth models as an output in response to receiving the three-dimensional digital training tooth models of the respective training datasets without local coordinate systems as input. The output may, e.g., be definitions of the assigned local coordinate systems or the three-dimensional digital training tooth models with the assigned local coordinate systems.

A machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

The term "machine learning" (ML) refers to a computer algorithm used to extract useful information from training data sets by building probabilistic models, which are referred to as machine learning modules or models, in an automated way. A machine learning module may also be referred to as a predictive model. Machine learning algorithms build a mathematical model based on sample data, known as "training data", in order to make predictions or decisions without being explicitly programmed to perform the task. The machine learning module may be performed using a learning algorithm such as supervised or unsupervised learning. The machine learning module may be based on various techniques such as clustering, classification, linear regression, reinforcement, self-learning, support vector machines, neural networks, etc. A machine learning module may, e.g., be a data structure or program such as a neural network, in particular a convolutional neural network, a support vector machine, a decision tree, a Bayesian network etc. The machine learning module may be adapted to predict an unmeasured value, e.g., a three-dimensional digital denture model, one or more three-dimensional digital tooth models, or a local coordinate system assigned to a three-dimensional digital tooth model as output by the trained machine learning module. The trained machine learning module may predict the unmeasured value from other, known values, e.g., a three-dimensional digital tissue model or a three-dimensional digital tooth model without local coordinate system as input. According to an example, the machine learning module may comprise a deep learning model.

For manufacturing the dental restoration or at least elements of the dental restoration, e.g., computer-controlled additive and/subtractive methods may be used. For example, the dental restoration being manufactured using at least one of the following: machining, three-dimensional printing, casting.

The dental restoration may, e.g., be a denture. For example, the dental restoration may, e.g., be a partial or a complete denture. A denture is a prosthetic device constructed to replace missing teeth and to be supported by surrounding soft and/or hard tissues of the oral cavity. The denture may, e.g., be a removable denture, e.g., a removable partial denture or a removable complete denture. Alternatively, the denture may, e.g., be a denture relying on bonding or clasping onto teeth or dental implants.

For example, the dental restoration may comprise one or more of the following: a veneer, a coping with coating, a crown, a bridge, a mockup, a waxup, a provisional.

A veneer is a layer of restoration material placed over a tooth, in order to cover one or more surfaces of the tooth. Veneers may, e.g., improve the aesthetics of a smile and/or protect the tooth's surface from damage. Indirect veneers are manufactured outside of a patient's oral cavity and then arranged on a tooth within the oral cavity. Direct veneers are built-up directly on a tooth inside a patient's oral cavity. The tooth may be prepared for receiving the veneer.

For example, two main types of restoration material may be used for manufacturing a veneer: composite and dental porcelain. A composite veneer may be directly placed on the tooth, i.e., built-up in the mouth of patient, or indirectly manufactured outside the mouth of the patient and later bonded to the tooth. In contrast, a porcelain veneer may only be indirectly manufactured outside the mouth of the patient. A full veneer crown, on the one hand, is dental restoration element that is configured to cover all the coronal tooth surfaces, i.e., the mesial, distal, facial, lingual, and occlusal surfaces. A laminate veneer, on the other hand, is a thin layer of restoration material that may, e.g., cover only a single surface of a tooth, e.g., a labial surface. A laminate veneer may generally be used for aesthetic purposes.

Coping with coating refers to a dental restoration element, which is directly built on the tooth to be restored. An underlying coping is arranged on the tooth. The coping is configured to replicate the performance of a natural tooth. On the coping a coating is applied, which is configured to replicate the natural aesthetics of the tooth to be restored. For example, a ceramic coating may be used. Using a coping with coating to restore a tooth may have the beneficial effect of providing a dental restoration element that combines both durability and natural aesthetics.

A crown is a dental restoration element in form of a dental cap. Such a crown may, e.g., be provided in form of a full coverage crown or a partial crown, like a ⅞ crown or a ¾ crown. Partial crowns, like ⅞ and ¾ crowns, are hybrids between an onlay and a full coverage crown. They are categorized based on an estimated degree of wall coverage of the walls of the prepared tooth, on which the respective crown is arranged. For example, a ¾ crown aims to cover three thirds of the walls of the tooth to be restored, e.g., three out of the four walls, e.g., with the buccal wall being spared. For example, a ⅞ crown aims to cover seven eights of the walls of the tooth to be restored. A full coverage crown completely caps or encircles a prepared tooth. A crown may, e.g., be required when a large cavity threatens the health of a tooth. A crown may be bonded to the tooth prepared for receiving the crown using a bonding material, e.g., a dental cement. A crown may be made from various materials, which may be fabricated using indirect methods, i.e., outside the patient's oral cavity. Crowns may be used to improve strength, to improve appearance of teeth and/or to halt deterioration.

A bridge is a dental restoration in form of a permanent appliance used to replace one or more missing teeth. A dental bridge comprises a plurality of artificial dental elements that are fused together, e.g., one or more artificial replacement teeth are definitively joined to adjacent teeth. A conventional bridge may be supported, e.g., by full coverage crowns, partial crowns, overlays, onlays or inlays on the abutment teeth. The abutment teeth require preparation and reduction to support the bridge.

A mockup prosthetic restoration composite is a composite to be arranged within a patient's mouth in order to visualize for the patient a result of a prosthetic restoration, before the actual prosthetic restoration is executed. Thus, the patient as well as a dentist may assess the expected esthetic and functional outcome of the prosthetic restoration. The final result to be expected may thus be visualized at an early stage of planning a prosthetic restoration. This approach may ensure that the patient as well as the dentist may have the same result to be achieved in mind and allows for potential adjustments to be made prior to the final restorations manufactured and applied, e.g., cemented.

A waxup prosthetic restoration refers to a prosthetic restoration made from laboratory wax. Such a waxup prosthetic restoration is used for acquiring information indicative of whether a specific prosthetic restoration is appropriate. A planned prosthetic restoration may be generated using from laboratory wax. The waxup prosthetic restoration may be used to test, whether the planned prosthetic restoration is appropriate. Using wax may have the beneficial effect, that the waxup prosthetic restoration may be easily adjusted to also test adjustments of the planned prosthetic restoration and/or adjusting the planned prosthetic restoration to requirements determined using the waxup prosthetic restoration.

A waxup model may, e.g., be used by a doctor and/or a practitioner for visualization purposes. Furthermore, it may, e.g., also be used for generating one or more in-mouth preparation guiding surfaces, e.g., using silicon imprints, where the doctor and/or practitioner may measure and/or visually gauge, whether a planned tooth reduction has been performed.

A provisional is a type of interim dental restoration designed to be a template for the final restoration. It is used to verify, e.g., a comfort in occlusion for the patient, esthetic parameters that satisfy the patient's and dentist's expected goals and/or phonetic evaluation for speech and airflow. Esthetic parameters may, e.g., comprise shape, midlines, smile line, embrasure shapes, and/or position of contacts. The phonetic evaluation for speech and airflow may ensure that no sibilance, whistlers, and/or lisp occur, and a clear articulation being enabled by the prosthetic restoration resembled by the provisional.

In another aspect, a computer program product is disclosed for adjusting an arrangement of a plurality of three-dimensional digital tooth models for a dental restoration. The computer program product comprises a computer readable storage medium having program instructions embodied therewith. The program instructions are executable by a processor of a computer device to cause the computer device to receive a three-dimensional digital denture model comprising the plurality of the three-dimensional digital tooth models. The three-dimensional digital denture model defines an arrangement of a plurality of three-dimensional digital tooth models for the dental restoration. A first input is received selecting at least one of the three-dimensional digital tooth models. The selected three-dimensional digital tooth model is paired with a corresponding three-dimensional digital tooth model of the three-dimensional digital tooth models. A second input is received defining a modification of the selected tooth model. A first calculation is performed for calculating a first adjustment of a geometric form of the selected tooth model based on the second input, wherein the first adjustment is calculated according to a local coordinate system of the selected tooth model. The calculated first adjustment is applied to the selected tooth model. A second calculation is performed for calculating a mapped adjustment of the geometric form of the paired corresponding tooth model based on the second input or the first calculation, wherein the mapped adjustment is based on a replica of the first adjustment adjusted relative to a local coordinate system of the paired corresponding tooth model. The calculated mapped adjustment is applied to the paired corresponding tooth model. The resulting adjusted three-dimensional digital denture model is provided for manufacturing the dental restoration.

The program instructions provided by the computer program may further be executable by the processor of the computer device to cause the computer device to execute any of the aforementioned examples of the method for adjusting an arrangement of a plurality of three-dimensional digital tooth models for a dental restoration.

In another aspect, a computer device is disclosed for adjusting an arrangement of a plurality of three-dimensional digital tooth models for a dental restoration. The computer device comprises a processor and a memory storing program instructions executable by the processor. Execution of the program instructions by the processor causes the computer device to receive a three-dimensional digital denture model comprising the plurality of the three-dimensional digital tooth models. The three-dimensional digital denture model defines the arrangement of the plurality of three-dimensional digital tooth models for the dental restoration. A first input is received selecting at least one of the three-dimensional digital tooth models. The selected three-dimensional digital tooth model is paired with a corresponding three-dimensional digital tooth model of the three-dimensional digital tooth models. A second input is received defining a modification of the selected tooth model. A first calculation is performed for calculating a first adjustment of a geometric form of the selected tooth model based on the second input, wherein the first adjustment is calculated according to a local coordinate system of the selected tooth model. The calculated first adjustment is applied to the selected tooth model. A second calculation is performed for calculating a mapped adjustment of the geometric form of the paired corresponding tooth model based on the second input or the first calculation, wherein the mapped adjustment is based on a replica of the first adjustment adjusted relative to a local coordinate system of the paired corresponding tooth model. The calculated mapped adjustment is applied to the paired corresponding tooth model. The resulting adjusted three-dimensional digital denture model is provided for manufacturing the dental restoration. For instance, the three-dimensional digital denture model defines an arrangement of the plurality of three-dimensional digital tooth models in which the plurality of three-dimensional digital tooth models is aligned along a curve descriptive of the curved form of a ridge of a jaw. Aligning the plurality of three-dimensional digital tooth models may, e.g., be performed before receiving the three-dimensional digital denture model, before receiving the first input or after pairing the selected three-dimensional digital tooth model with a corresponding three-dimensional digital tooth model.

Execution of the program instructions by the processor may further cause the computer device to execute any of the aforementioned examples of the method for adjusting an arrangement of a plurality of three-dimensional digital tooth models for a dental restoration.

In another aspect, a manufacturing system is disclosed. The system comprises a computer device according to any of the aforementioned examples of a computer device. The manufacturing system further comprises one or more manufacturing devices configured for manufacturing a dental restoration. Execution of the program instructions by the processor further causes the computer device to generate a three-dimensional digital dental restoration model of the dental restoration to be manufactured using the adjusted three-dimensional digital denture model provided for manufacturing the dental restoration. Execution of the program instructions by the processor further causes the computer device to control the one or more manufacturing devices to manufacture the dental restoration using the three-dimensional digital denture model as a template. The manufactured dental restoration is a physical copy of the template.

Execution of the program instructions by the processor may further cause the computer device to control the one or more manufacturing devices to manufacture a dental restoration using a three-dimensional digital dental restoration model of the dental restoration generated using any of the aforementioned examples of the adjusted three-dimensional digital denture model provided for manufacturing the dental restoration.

For example, the one or more manufacturing devices may comprise one or more of the following devices: a 3D printing device, a machining device.

The same or similar advantages of the aforementioned method and examples of the method can be correspondingly applied to the computer program product, the computer device, and the manufacturing system.

It is understood that one or more of the aforementioned examples may be combined as long as the combined examples are not mutually exclusive.

BRIEF DESCRIPTION OF THE DRAWINGS

In the following, examples are described in greater detail making reference to the drawings in which.

DETAILED DESCRIPTION

Figure 1:
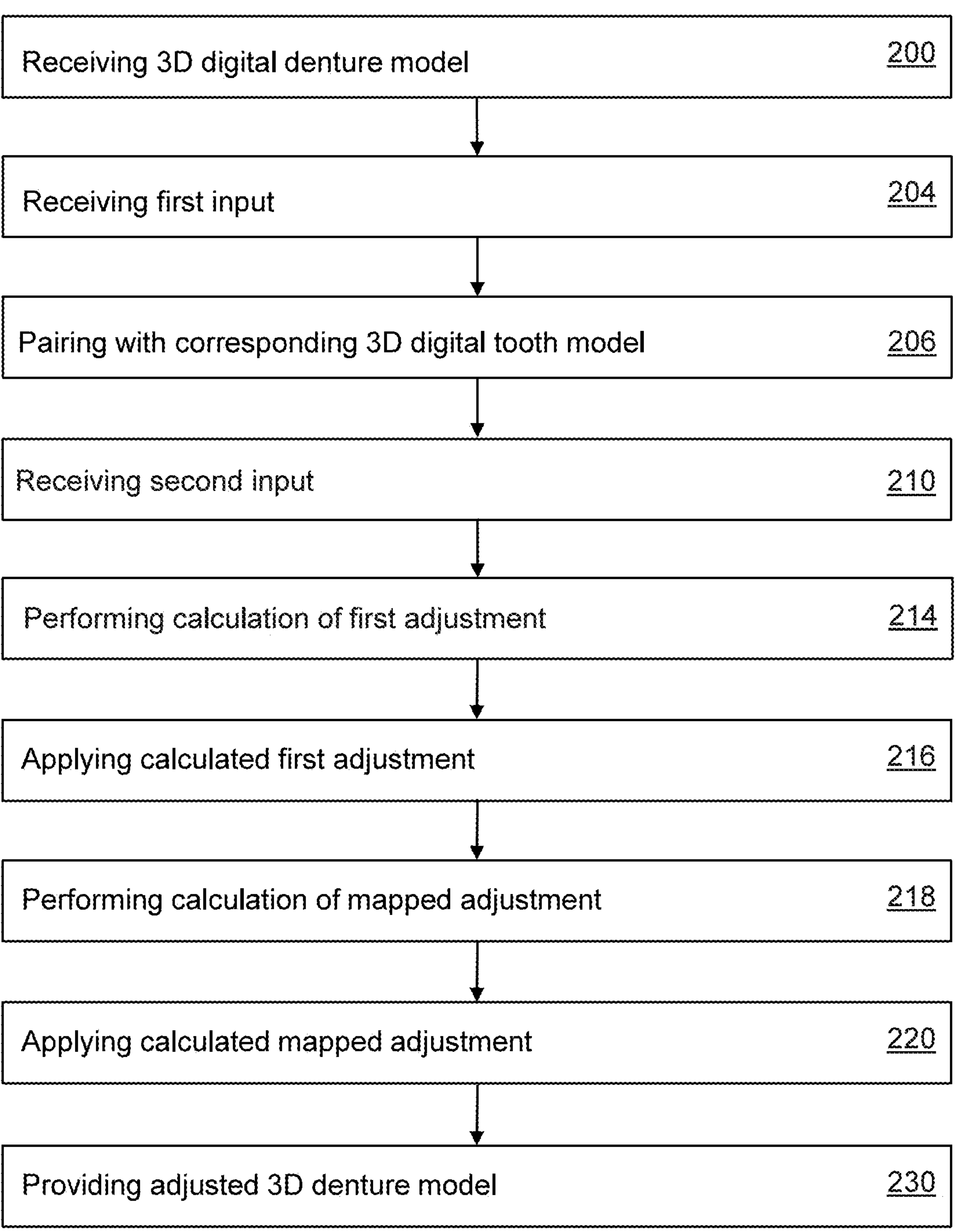
FIG. 1 is a flowchart of an exemplary method for adjusting an arrangement of three-dimensional digital tooth models.

In the following, similar elements are denoted by the same reference numerals.

FIG. 1 shows an exemplary method adjusting an arrangement of a plurality of three-dimensional digital tooth models for a dental restoration. In block 200, a three-dimensional digital denture model is received, which comprises the plurality of the three-dimensional digital tooth models. The three-dimensional digital denture model defines the arrangement of the plurality of three-dimensional digital tooth models for the dental restoration. In block 204, a first input is received selecting at least one of the three-dimensional digital tooth models. In block 206, the selected three-dimensional digital tooth model is paired with a corresponding three-dimensional digital tooth model of the three-dimensional digital tooth models. In block 210, a second input is received defining a modification of the selected tooth model. In block 214, a first calculation is performed for calculating a first adjustment of a geometric form of the selected tooth model based on the second input. The first adjustment is calculated according to a local coordinate system of the selected tooth model. In block 216, the calculated first adjustment is applied to the selected tooth model.

In block 218, a second calculation is performed for calculating a mapped adjustment of the geometric form of the paired corresponding tooth model based on the second input or the first calculation. The mapped adjustment is based on a replica of the first adjustment adjusted relative to a local coordinate system of the paired corresponding tooth model. In block 220, the calculated mapped adjustment is applied to the paired corresponding tooth model. In block 230, a resulting adjusted three-dimensional digital denture model is provided for manufacturing the dental restoration.

Figure 2A:
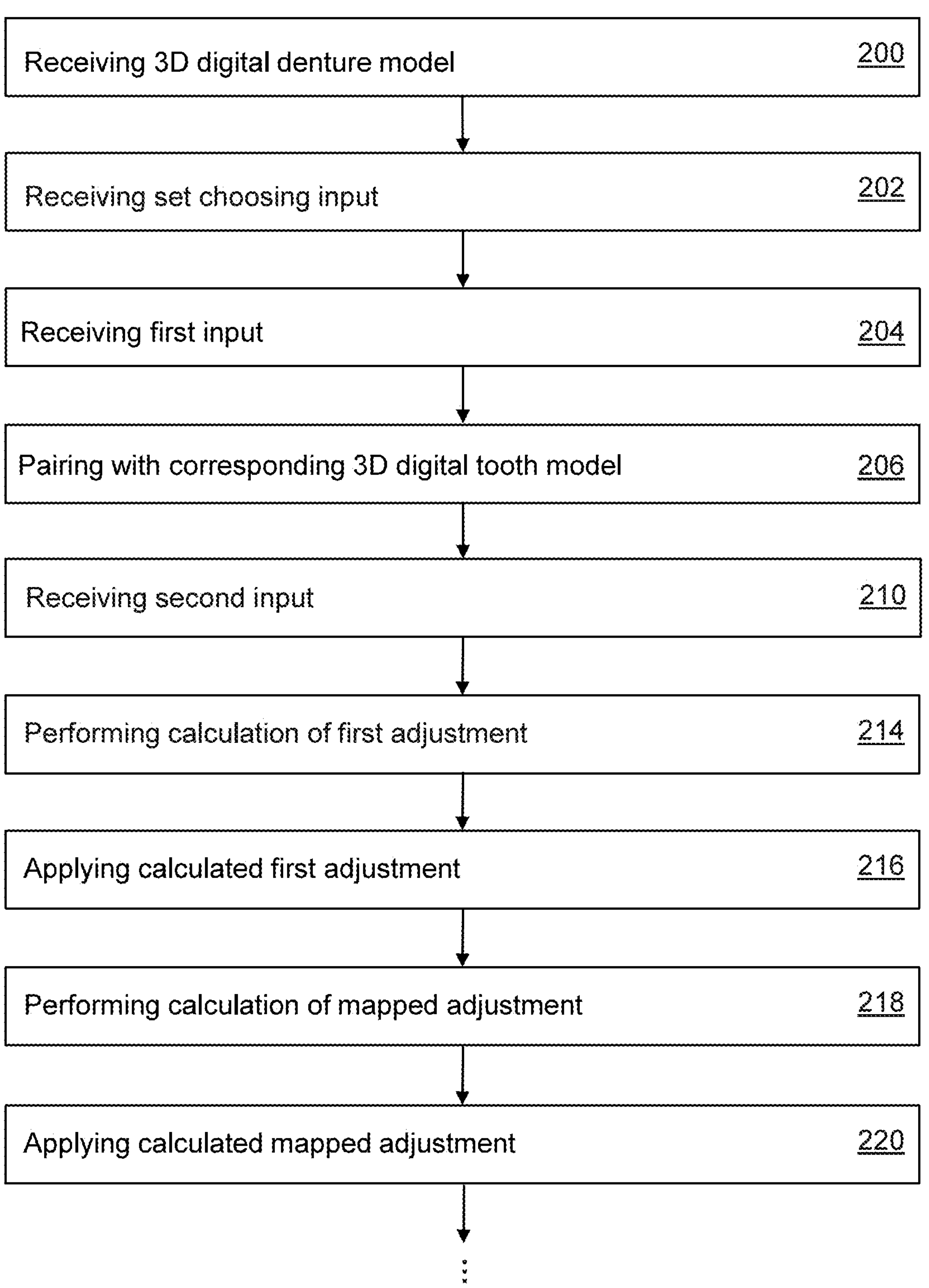
FIG. 2A, 2B is a flowchart of another exemplary method for adjusting an arrangement of three-dimensional digital tooth models.
Figure 2B:
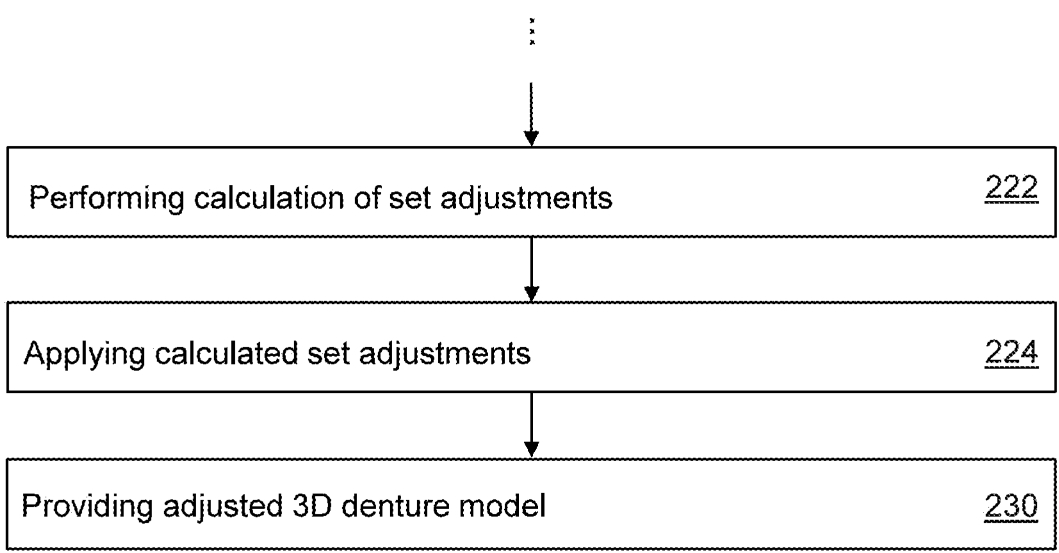

FIGS. 2A and 2B show another exemplary method adjusting an arrangement of a plurality of three-dimensional digital tooth models for a dental restoration. FIG. 2A comprising blocks 200 to 220 shows a first part of the method, which is continued with a second part comprising blocks 222 to 230 in FIG. 2B. In block 200, a three-dimensional digital denture model is received, which comprises the plurality of the three-dimensional digital tooth models. The three-dimensional digital denture model defines the arrangement of the plurality of three-dimensional digital tooth models for the dental restoration. In block 202, a set choosing input is received. The set choosing input may define a set of three-dimensional digital tooth models, which comprises three-dimensional tooth models of the plurality of three-dimensional digital tooth models. The set may comprise some or all of the three-dimensional tooth models of the plurality of three-dimensional digital tooth models. In block 204, a first input is received selecting at least one three-dimensional digital tooth models of the set of three-dimensional tooth models. In block 206, the selected three-dimensional digital tooth model is paired with a corresponding three-dimensional digital tooth model of the set of three-dimensional digital tooth models.

In block 210, a second input is received defining a modification of the selected tooth model. In block 214, a first calculation is performed for calculating a first adjustment of a geometric form of the selected tooth model based on the second input. The first adjustment is calculated according to a local coordinate system of the selected tooth model. In block 216, the calculated first adjustment is applied to the selected tooth model.

In block 218, a second calculation is performed for calculating a mapped adjustment of the geometric form of the paired corresponding tooth model based on the second input or the first calculation. The mapped adjustment is based on a replica of the first adjustment adjusted relative to a local coordinate system of the paired corresponding tooth model. In block 220, the calculated mapped adjustment is applied to the paired corresponding tooth model.

In block 222, a third calculation of set adjustments of the geometric forms of the remaining three-dimensional digital tooth models of the set of three-dimensional digital tool models is performed. The set of three-dimensional tooth models comprises the selected tooth model, the paired corresponding tooth model and remaining three-dimensional tooth models of the plurality of three-dimensional digital tooth models. The set adjustments are calculated based on the first and the second calculation. In block 224, the calculated set adjustments are applied to the remaining tooth models. In block 230, a resulting adjusted three-dimensional digital denture model is provided for manufacturing the dental restoration.

Figure 3A:
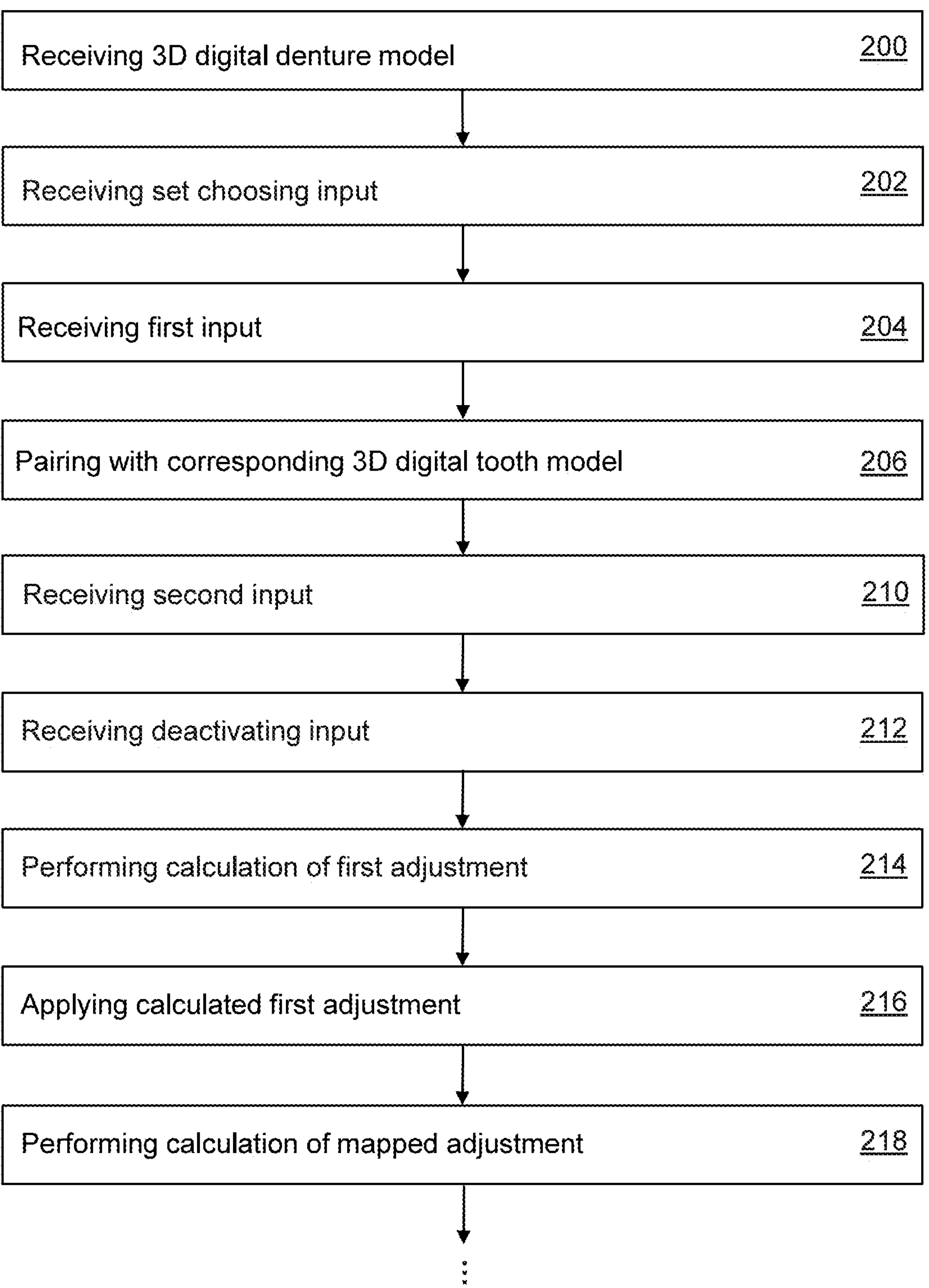
FIG. 3A, 3B is a flowchart of another exemplary method for adjusting an arrangement of three-dimensional digital tooth models.
Figure 3B:
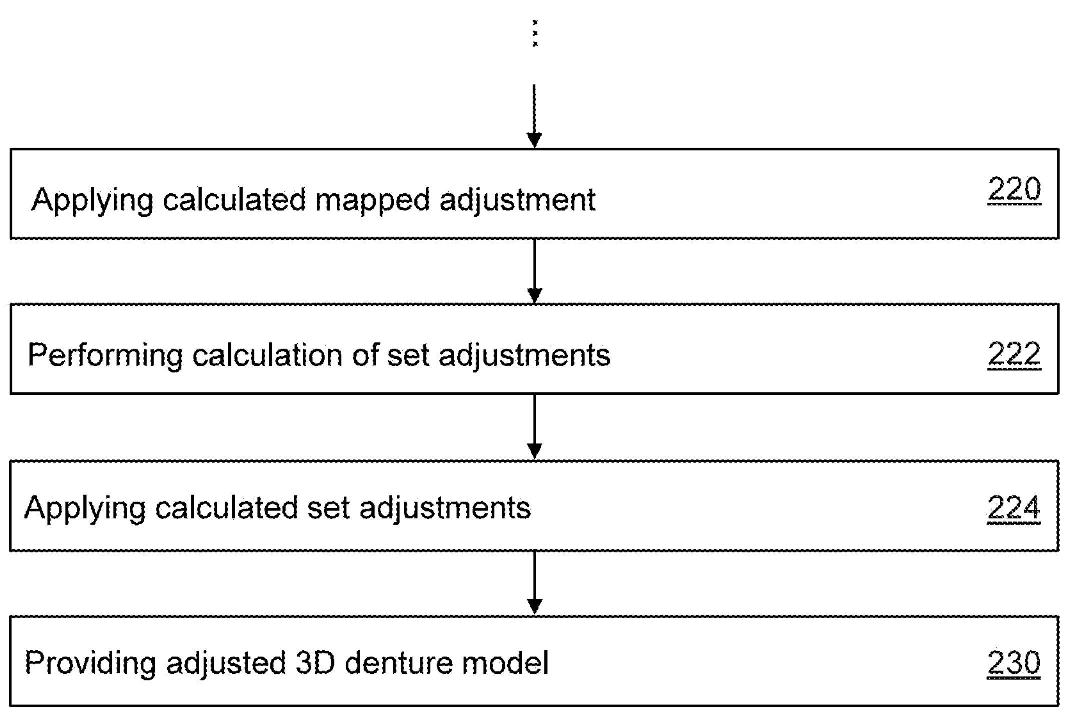

FIGS. 3A and 3B show another exemplary method adjusting an arrangement of a plurality of three-dimensional digital tooth models for a dental restoration. FIG. 3A comprising blocks 200 to 218 shows a first part of the method, which is continued with a second part comprising blocks 220 to 230 in FIG. 3B. In block 200, a three-dimensional digital denture model is received, which comprises the plurality of the three-dimensional digital tooth models. The three-dimensional digital denture model defines the arrangement of the plurality of three-dimensional digital tooth models for the dental restoration. In block 202, a set choosing input is received. The set choosing input may define a set of three-dimensional digital tooth models, which comprises three-dimensional tooth models of the plurality of three-dimensional digital tooth models. The set may comprise some or all of the three-dimensional tooth models of the plurality of three-dimensional digital tooth models. In block 204, a first input is received selecting at least one three-dimensional digital tooth models of the set of three-dimensional tooth models. In block 206, the selected three-dimensional digital tooth model is paired with a corresponding three-dimensional digital tooth model of the set of three-dimensional digital tooth models.

In block 210, a second input is received defining a modification of the selected tooth model. In block 212, a deactivating input may be received. The set of three-dimensional tooth models comprises the selected tooth model, the paired corresponding tooth model and remaining three-dimensional tooth models of the plurality of three-dimensional digital tooth models. The deactivating input deactivates one of the remaining tooth models. In block 214, a first calculation is performed for calculating a first adjustment of a geometric form of the selected tooth model based on the second input. The first adjustment is calculated according to a local coordinate system of the selected tooth model. In block 216, the calculated first adjustment is applied to the selected tooth model.

In block 218, a second calculation is performed for calculating a mapped adjustment of the geometric form of the paired corresponding tooth model based on the second input or the first calculation. The mapped adjustment is based on a replica of the first adjustment adjusted relative to a local coordinate system of the paired corresponding tooth model. In block 220, the calculated mapped adjustment is applied to the paired corresponding tooth model.

In block 222, a third calculation of set adjustments of the geometric forms of the remaining three-dimensional digital tooth models of the set of three-dimensional digital tool models is performed. The set adjustments are not calculated for the deactivated remaining tooth models. The set adjustments are calculated based on the first and the second calculation as well as based on a geometric form of the deactivated remaining tooth model. In block 224, the calculated set adjustments are applied to the remaining tooth models. In block 230, a resulting adjusted three-dimensional digital denture model is provided for manufacturing the dental restoration.

Figure 4A:
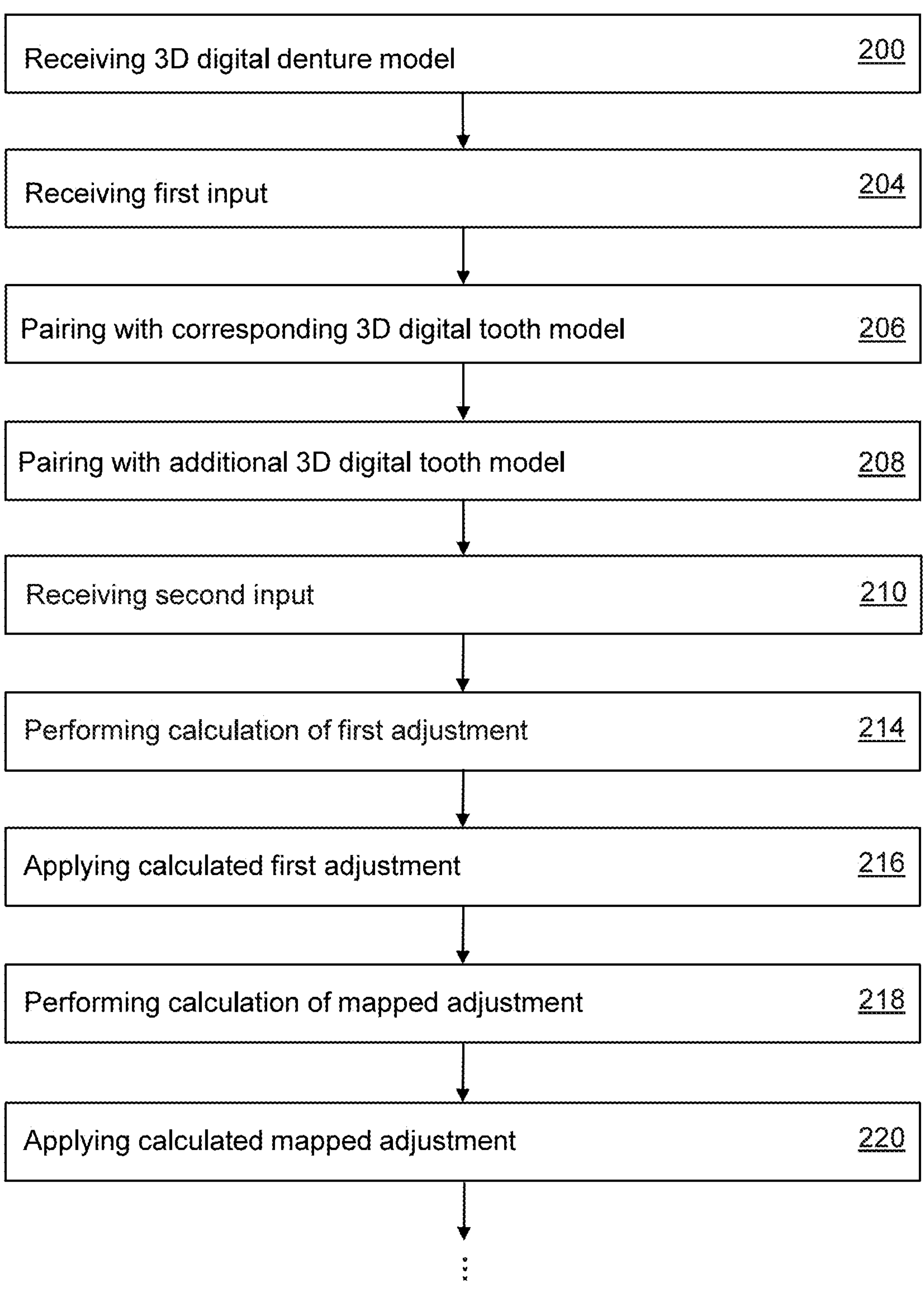
FIG. 4A, 4B is a flowchart of another exemplary method for adjusting an arrangement of three-dimensional digital tooth models.
Figure 4B:
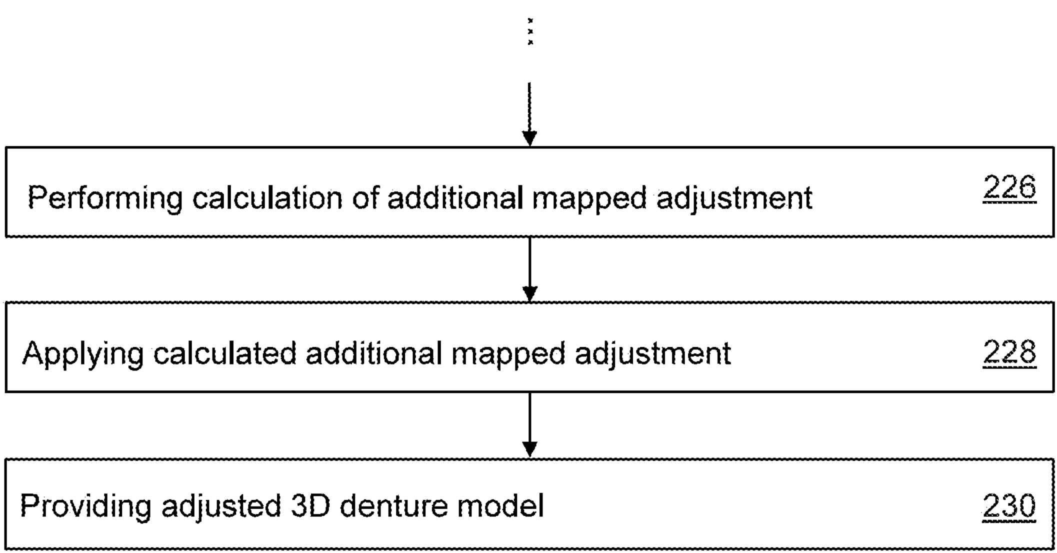

FIGS. 4A and 4B show another exemplary method adjusting an arrangement of a plurality of three-dimensional digital tooth models for a dental restoration. FIG. 4A comprising blocks 200 to 220 shows a first part of the method, which is continued with a second part comprising blocks 226 to 230 in FIG. 4B. In block 200, a three-dimensional digital denture model is received, which comprises the plurality of the three-dimensional digital tooth models. The three-dimensional digital denture model defines the arrangement of the plurality of three-dimensional digital tooth models for the dental restoration. In block 204, a first input is received selecting at least one of the three-dimensional digital tooth models. In block 206, the selected three-dimensional digital tooth model is paired with a corresponding three-dimensional digital tooth model of the three-dimensional digital tooth models. In block 208, the selected digital tooth model is further paired with an additional three-dimensional digital tooth model of the three-dimensional digital tooth models.

In block 210, a second input is received defining a modification of the selected tooth model. In block 214, a first calculation is performed for calculating a first adjustment of a geometric form of the selected tooth model based on the second input. The first adjustment is calculated according to a local coordinate system of the selected tooth model. In block 216, the calculated first adjustment is applied to the selected tooth model. In block 218, a second calculation is performed for calculating a mapped adjustment of the geometric form of the paired corresponding tooth model based on the second input or the first calculation. The mapped adjustment is based on a replica of the first adjustment adjusted relative to a local coordinate system of the paired corresponding tooth model. In block 220, the calculated mapped adjustment is applied to the paired corresponding tooth model.

In block 226, a fourth calculation of an additional mapped adjustment of a geometric form of the additional tooth model is performed based on the second input or the first calculation. The additional mapped adjustment is based on an additional replica of the first adjustment adjusted relative to the local coordinate system of the additional tooth model. In block 228, the calculated additional mapped adjustment is applied to the additional tooth model. In block 230, a resulting adjusted three-dimensional digital denture model is provided for manufacturing the dental restoration.

Figure 5:
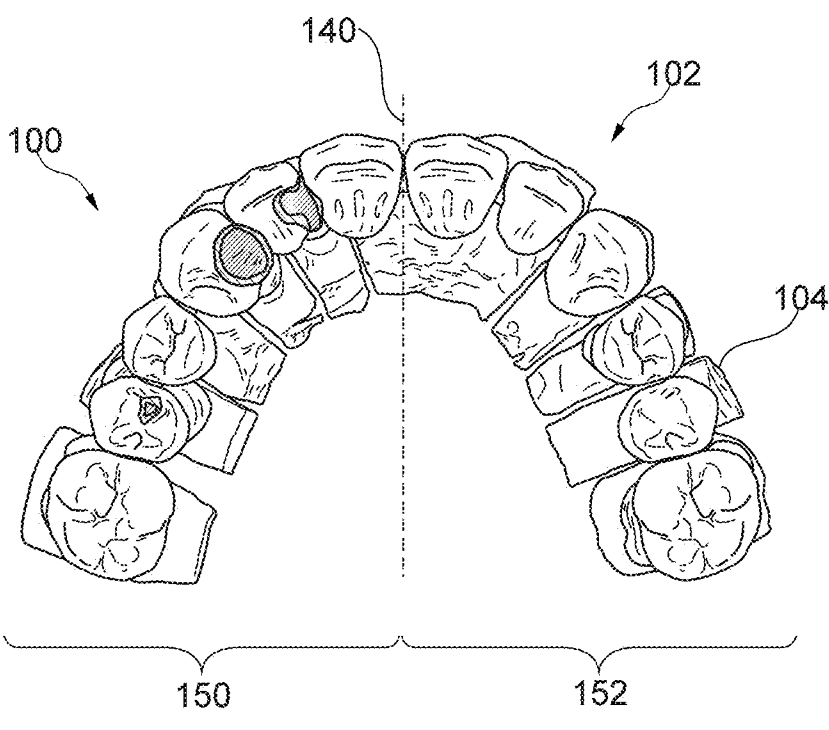
FIG. 5 shows an exemplary arrangement of a plurality of three-dimensional digital tooth models satisfying an exact global symmetry.

FIG. 5 shows an exemplary arrangement of a plurality of three-dimensional digital tooth models 102 satisfying an exact global symmetry. The plurality of three-dimensional digital tooth models 102 may be comprised by an exemplary three-dimensional digital denture model 100. The three-dimensional digital denture model 100 with the plurality of three-dimensional digital tooth models 102 is arranged on a three-dimensional digital tissue model 104. The view depicted in FIG. 5 is a view onto the three-dimensional digital tissue model 104 and the three-dimensional digital denture model 100 in apical direction of the three-dimensional digital tooth models 102.

An arrangement of the three-dimensional digital tooth models 102 defined by the three-dimensional digital denture model 100 may, e.g., be an arrangement such that the plurality of three-dimensional digital tooth models 102 is aligned along a curved arch descriptive of a curved form of a ridge of a jaw defined by the three-dimensional digital tissue model 104.

The exact global symmetry satisfied by the plurality of three-dimensional digital tooth models 102 may, e.g., be an exact global symmetry with respect to a plane of symmetry 140. The plane of symmetry 140 may, e.g., be a sagittal plane dividing the arrangement of the plurality of three-dimensional digital tooth models 102 into two halves 150 and 152. One halve 150 is arranged on one hemisphere of a jaw bow defined by the three-dimensional digital tissue model 104, while the other halve 152 be arranged symmetrically on an opposite hemisphere of the respective jaw bow. The three-dimensional digital tooth models 102 of the three-dimensional digital denture model 100 are, e.g., configured symmetrical with respect to the plane of symmetry 140. For example, positions, orientations, geometric forms, surface topologies, and/or sizes of contralateral counterpart tooth arranged on opposite sides of the plane of symmetry 140 may satisfy an exact global symmetry with respect to the plane of symmetry 140, i.e., a mirror symmetry with respect to this plane of symmetry 140.

For example, all the three-dimensional digital tooth models of the plurality of three-dimensional digital tooth models 102 may be mirrored exactly from one side of the plane of symmetry 140 to another. The exact global symmetry shown in FIG. 5 may, e.g. be the result of using a chain mode with exact mirroring of the teeth. i.e., teeth shapes, from one side to another according to the given symmetry plane 140.

Figure 6:
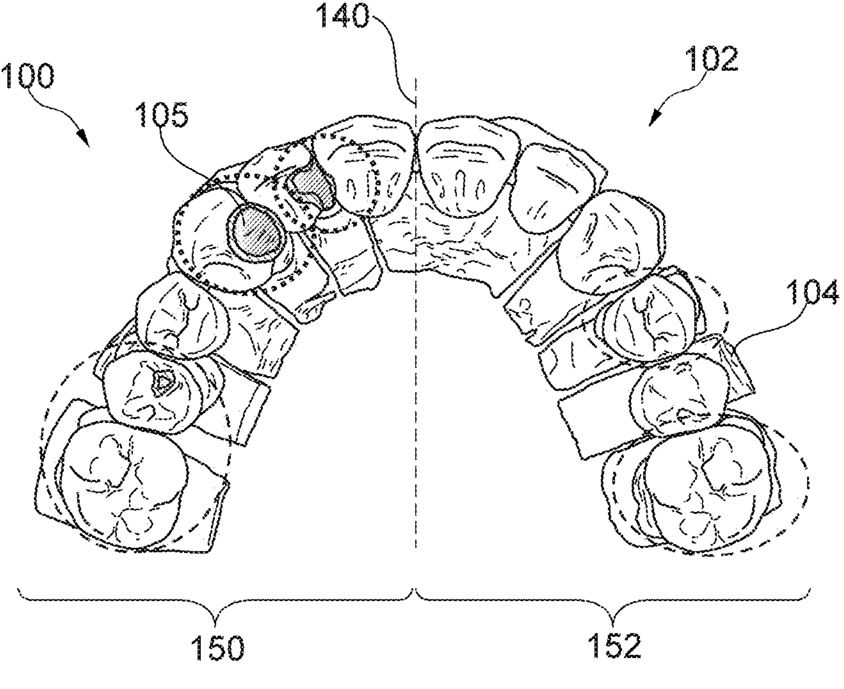
FIG. 6 shows the exemplary arrangement of the plurality of three-dimensional digital tooth models satisfying the exact global symmetry of FIG. 5.

FIG. 6 shows the exemplary arrangement of the plurality of three-dimensional digital tooth models satisfying the exact global symmetry of FIG. 5. As shown in FIG. 6, for some of the three-dimensional digital tooth models of the plurality of three-dimensional digital tooth models 102, which are indicated by dashed circles, it may be possible to configure them to satisfy the exact global symmetry, while at the same time avoiding conflicts with the three-dimensional digital tissue model 104. However, for some parts of the jaw defined by the three-dimensional digital tissue model 104 conflicts between the three-dimensional digital tooth models of the plurality of three-dimensional digital tooth models 102, which are indicated by dotted circles, and the three-dimensional digital tissue model 104 may arise, when configuring the three-dimensional digital tooth models to satisfy the exact global symmetry. For example, penetrations 105 of the symmetrically three-dimensional digital tooth models 102 by the three-dimensional digital tissue model 104 may occur. Consequently, a symmetrical setup of the plurality of three-dimensional digital tooth models satisfying an exact global symmetry may not always be possible.

Figure 7:
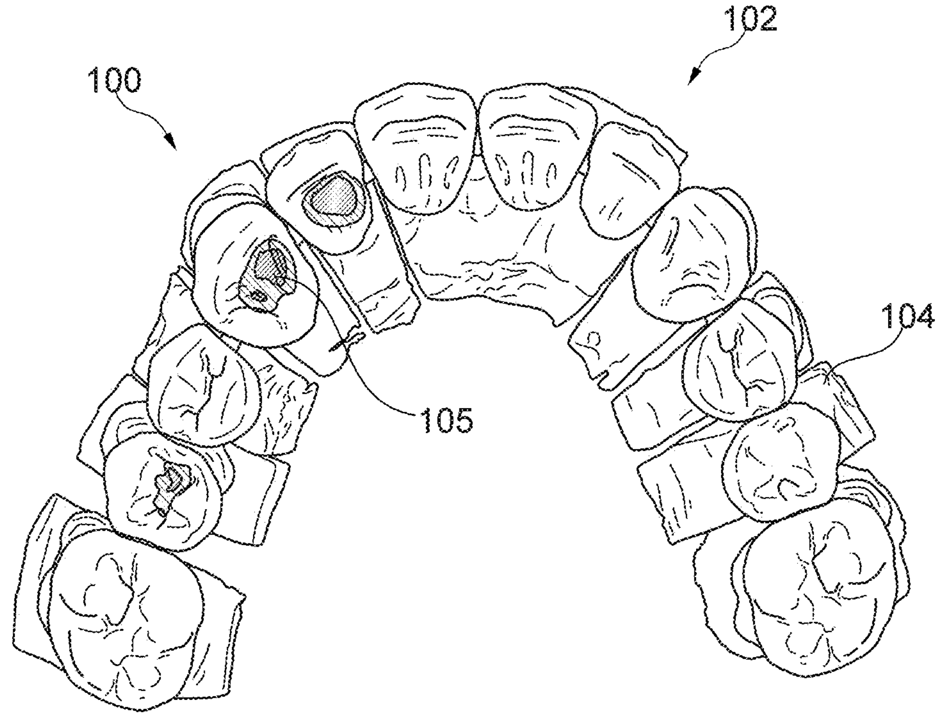
FIG. 7 shows an exemplary arrangement of a plurality of three-dimensional digital tooth models being configured quasi-symmetrical.

FIG. 7 shows an exemplary arrangement of a plurality of three-dimensional digital tooth models 102 being configured quasi-symmetrical. Like in FIGS. 5 and 6, the plurality of three-dimensional digital tooth models 102 may be comprised by an exemplary three-dimensional digital denture model 100. The three-dimensional digital denture model 100 with the plurality of three-dimensional digital tooth models 102 is arranged on a three-dimensional digital tissue model 104. The view depicted in FIG. 7 is a view onto the three-dimensional digital tissue model 104 and the three-dimensional digital denture model 100 in apical direction of the three-dimensional digital tooth models 102. An arrangement of the three-dimensional digital tooth models 102 defined by the three-dimensional digital denture model 100 may, e.g., be an arrangement such that the plurality of three-dimensional digital tooth models 102 is aligned along a curved arch descriptive of a curved form of a ridge of a jaw defined by the three-dimensional digital tissue model 104.

However, no exact global symmetry is implemented between the of three-dimensional digital tooth models of the plurality of three-dimensional digital tooth models 102. Still, the three-dimensional digital tooth models may be configured quasi-symmetrical. The problem of penetrations 105 may thus, e.g., be reduced or resolved. When applying a modification to a selected one of the three-dimensional digital tooth models, the modification, i.e., the resulting adjustment, may be mapped to a paired corresponding tooth model. The mapped adjustment may, e.g., be adjusted to a local coordinate system of the paired corresponding tooth model. Thus, a quasi-symmetrical relationship between the paired tooth models may be maintained, even in case one of the respective tooth models is modified.

Figure 8:
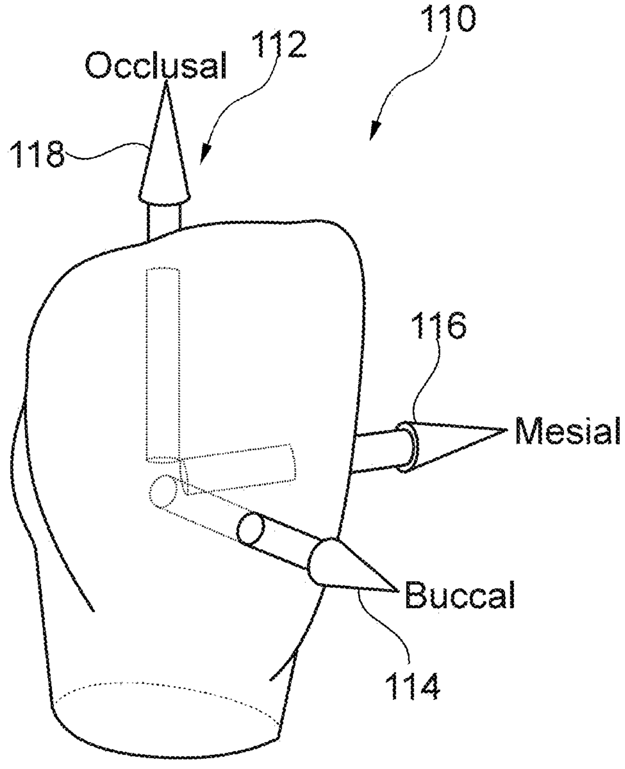
FIG. 8 shows an exemplary three-dimensional digital tooth model with a local coordinate system.

FIG. 8 shows an exemplary three-dimensional digital tooth model, which may, e.g., be a selected three-dimensional digital tooth model 110. The three-dimensional digital tooth model 110 may, e.g., be selected from a plurality of three-dimensional digital tooth models. The three-dimensional digital tooth model 110 is assigned with a local coordinate system 112. The local coordinate system 112 of three-dimensional digital tooth model 110 is aligned with one or more anatomical features, e.g., anatomical directions of the three-dimensional digital tooth model 110.

In the example of FIG. 8, the local coordinate system 112 is an orthogonal coordinate system using, e.g., a Cartesian coordinates. However, also other types of coordinates could be used instead, like, e.g., cylindrical polar coordinates or spherical coordinates. A Cartesian coordinate system for a three-dimensional space consists of an ordered triplet of lines, i.e., axes, which go through a common point, referred to as the origin, and are pair-wise perpendicular. A Cartesian coordinate system may describe an orientation for each axis as well as a single unit of length for all three axes. In the example shown, the orientations of the three axes 114, 116, 118 of the local coordinate system 112 are anatomical directions of the three-dimensional digital tooth model 110. For example, a first axis 114 is an axis oriented along a buccal direction of the three-dimensional digital tooth model 110. A second axis 116 may, e.g., be an axis oriented along a mesial direction of the three-dimensional digital tooth model 110 and a third axis 118 may, e.g., be an axis oriented along an occlusal direction of the three-dimensional digital tooth model 110. For sake of simplicity, the term buccal is used independently of the type of tooth described by the three-dimensional digital tooth model 110, i.e., posterior teeth as well as anterior teeth. In other words, it is used as a synonym for vestibular and may actually refer to a buccal as well as a labial direction. For sake of simplicity, the term occlusal is used independently of the type of tooth described by the three-dimensional digital tooth model 110, i.e., posterior teeth as well as anterior teeth and generally refers to a coronal direction of the respective tooth. In other words, in case of anterior teeth it is used as a synonym for incisal. The mesial direction refers to a direction toward an anterior midline in a dental arch. Thus, for two adjacent incisors arranged on opposite sides of the anterior midline, the individual mesial directions may be opposite directions depending on the exact orientation of the respective tooth.

Please note, that the actual orientation of the axes of the local coordinate systems from a global point of view may differ depending on the orientation of the respective teeth. Since the local coordinate systems are assigned to the teeth with a fixed relative orientation, their orientations change with the orientations of the teeth they are assigned to. Therefore, they are referred to as local coordinate systems.

For example, an input may be received, which defines a modification of the selected tooth model 110 in the buccal direction. Based on this input an adjustment of the geometric form of the selected tooth model 110 is calculated according to a local coordinate system of the selected tooth model 110 and applied to the same. For a modification in the buccal direction, e.g., an adjustment along the vector [1,0,0] within the local coordinate system 112 of the respective tooth model 110 may be calculated. The adjustment may, e.g., be a deformation of the geometric form of the tooth model 110 along the vector [1,0,0].

Furthermore, a mapped adjustment of a geometric form of a corresponding tooth model paired with the selected tooth model 110 may be calculated. The mapped adjustment may be calculated based on one of the following: second input defining the modification of the selected tooth model 110 or the calculation of the adjustment of the geometric form of the selected tooth model 110. The calculated mapped adjustment of the geometric form of the paired corresponding tooth model based may be based on a replica of the adjustment of the geometric form of the selected tooth model 110 adjusted relative to a local coordinate system of the paired corresponding tooth model. For an adjustment of the geometric form of the selected tooth model 110 along the vector [1,0,0] within the local coordinate system 112, a mapped adjustment may be calculated, which is an adjustment of the geometric form of the paired corresponding tooth model along the vector [1,0,0] within the local coordinate system of the respective corresponding tooth model. In case the selected tooth model 110 and thus the local coordinate system 112 of the selected tooth model 110 is rotated relative to an orientation of the paired corresponding tooth model and thus the local coordinate system of the paired corresponding tooth model relative to an exact global symmetry, e.g., plane of symmetry. For example, an angle between the buccal direction of the local coordinate system 112 of the selected tooth model 110 and the plane of symmetry may be $\alpha$, while an angle between the buccal direction the local coordinate system of the paired corresponding tooth model may be $\beta$ with $\alpha \neq \beta$. The orientations of the selected tooth model and the corresponding tooth may not satisfy an exact global symmetry. Thus, also the adjustments of the selected tooth model and the paired corresponding tooth model may not satisfy the exact global symmetry. Nevertheless, with regard to the individual local coordinate systems the adjustments of the tooth models are implemented in a similar manner, i.e., both in a buccal direction of the respective tooth. This implementation of adjustments along the same directions with respect to the local coordinate systems of paired tooth models is referred to as a mirroring. This mirroring of adjustments between paired tooth models may even be implemented in case the paired tooth models do not satisfy a global symmetry. For example, their positions, orientations, sizes, geometric forms, and/or surface topologies may violate the exact global symmetry.

In case of a rotation of the selected tooth model 110, the calculated adjustment may, e.g., be a rotation around an axis of rotation by an angle $\gamma$. A position of this axis of rotation may be defined relative to the axes 114, 116, 118 of the local coordinates system 112 of the selected tooth model 110. The calculated mapped adjustment may define a rotation around an axis of rotation by an angle $\gamma$ as well, with a position of the respective axis of rotation being defined relative to the axes of the local coordinate system of the paired corresponding tooth model being equal to the definition of the axis of rotation relative to the axes 114, 116, 118 of the local coordinates system 112 of the selected tooth model 110. In case of two tooth models from different hemispheres of a dental arch, one of the local coordinate systems may, e.g., be a right-handed coordinate system, while the other local coordinates system may, e.g., be a left-handed coordinate system. The same may, e.g., be true for two tooth models from opposing jaws.

Figure 9:
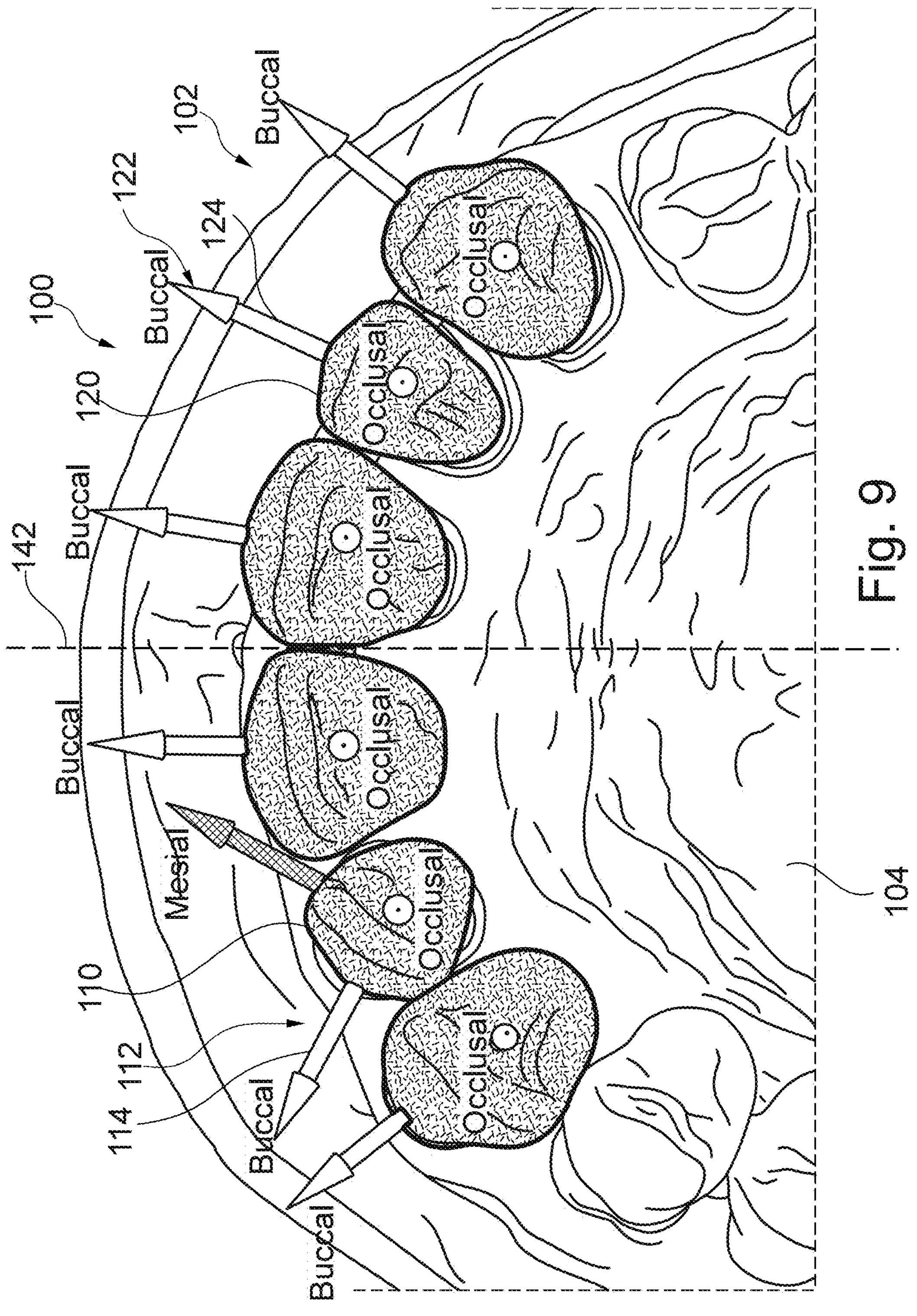
FIG. 9 shows an exemplary three-dimensional digital denture model comprising a plurality of three-dimensional digital tooth models for a dental restoration.

FIG. 9 shows an exemplary three-dimensional digital denture model 100 comprising a plurality of three-dimensional digital tooth models 102 for a dental restoration. The three-dimensional digital denture model 100 with the plurality of three-dimensional digital tooth models 102 is arranged on a three-dimensional digital tissue model 104. The view depicted in FIG. 9 is a view onto the three-dimensional digital tissue model 104 and the three-dimensional digital denture model 100 in apical direction of the three-dimensional digital tooth models 102. An arrangement of the three-dimensional digital tooth models 102 defined by the three-dimensional digital denture model 100 may, e.g., be an arrangement such that the plurality of three-dimensional digital tooth models 102 is aligned along a curved arch descriptive of a curved form of a ridge of a jaw defined by the three-dimensional digital tissue model 104. Each of the three-dimensional digital tooth models 102 is assigned with a local coordinate system. The orientations of the local coordinate systems of the three-dimensional digital tooth models 102 relative to each other depends on the orientations of the three-dimensional digital tooth models 102 relative to each other.

The plurality of three-dimensional digital tooth models 102 may comprise a selected tooth model 110 with a local coordinate system 112. The selected tooth model may, e.g. be selected by an input being received. The selected tooth model 110 may, e.g., be paired with a corresponding tooth model 120. The paired corresponding tooth models 120 is assigned with a local coordinate system 122. In FIG. 9, the paired corresponding tooth model 120 is, e.g., a contralateral counterpart tooth model with respect to the selected tooth model 110.

The local coordinate system 112 of the selected tooth model 110 may, e.g., be a left-handed coordinate system, while the local coordinate system 122 of the paired corresponding tooth model 120 may, e.g., be a right-handed coordinate system. This may, e.g., be the case for a corresponding tooth model 120 arranged relative to the selected tooth model 110 in the opposite hemisphere of the dental arch. As shown in FIG. 9 orientations of the selected tooth model 110 and the paired corresponding tooth model 120 are not symmetric with respect to the plane 142. Consequently, also the orientations of the local coordinate systems 112, 122 of the two models 110, 120 are not symmetric with respect to the plane 142.

Thus, an adjustment applied to the selected tooth model 110 along the direction of the buccal coordinate axis 114 of its local coordinate system 112 may be mapped onto the paired corresponding tooth model 120 as a replica, which is adjusted relative to a local coordinate system 122 of the paired corresponding tooth model 120. Due to the adjustment to the local coordinate system 122 of the paired corresponding tooth model 120, the mapped adjustment may be applied in the along the direction of the buccal coordinate axis 124 of local coordinate system 122 of the paired corresponding tooth model 120. Since the two local coordinate systems 112, 122 are not symmetric with respect to plane 142, the two adjustments are not symmetric with respect to plane 142 as well.

Figure 10:
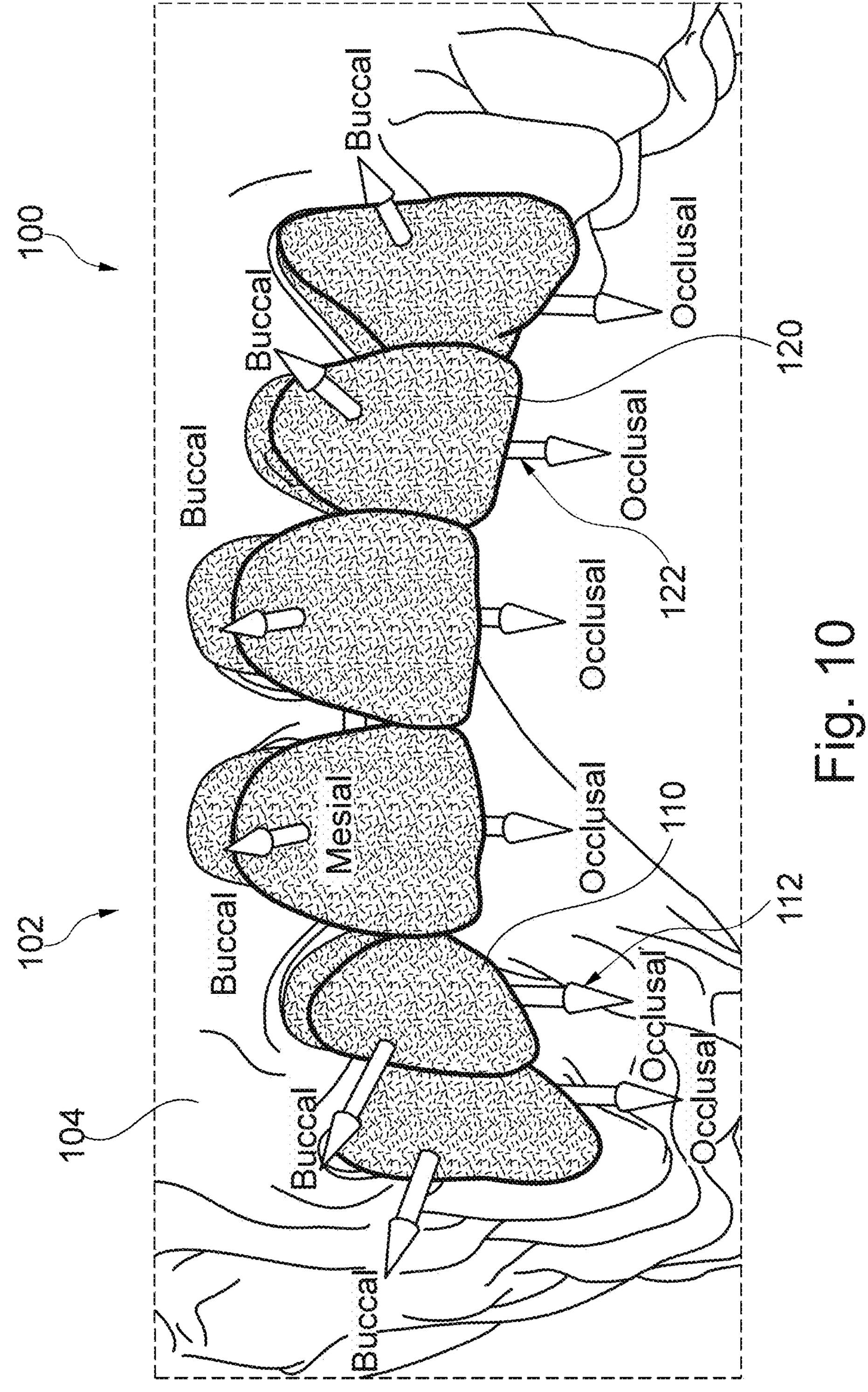
FIG. 10 shows an exemplary three-dimensional digital denture model comprising a plurality of three-dimensional digital tooth models for a dental restoration.

FIG. 10 shows the three-dimensional digital denture model 100 of FIG. 9 with the plurality of three-dimensional digital tooth models 102 arranged on the three-dimensional digital tissue model 104. The view depicted in FIG. 10 is a front-view onto the three-dimensional digital tissue model 104 in palatal direction. Each of the three-dimensional digital tooth models 102 is assigned with a local coordinate system. The orientations of the local coordinate systems of the three-dimensional digital tooth models 102 relative to each other depends on the orientations of the three-dimensional digital tooth models 102 relative to each other.

The plurality of three-dimensional digital tooth models 102 comprises the selected tooth model 110 with its local coordinate system 112, which is paired with the paired corresponding tooth model 120. The paired corresponding tooth models 120 comprises the local coordinate system 122. In FIG. 10, the orientation of the selected tooth model 110 with its local coordinate system 112 relative to the three-dimensional digital tissue model 104 differs from the orientation of the selected tooth model 110 in FIG. 9.

Figure 11:
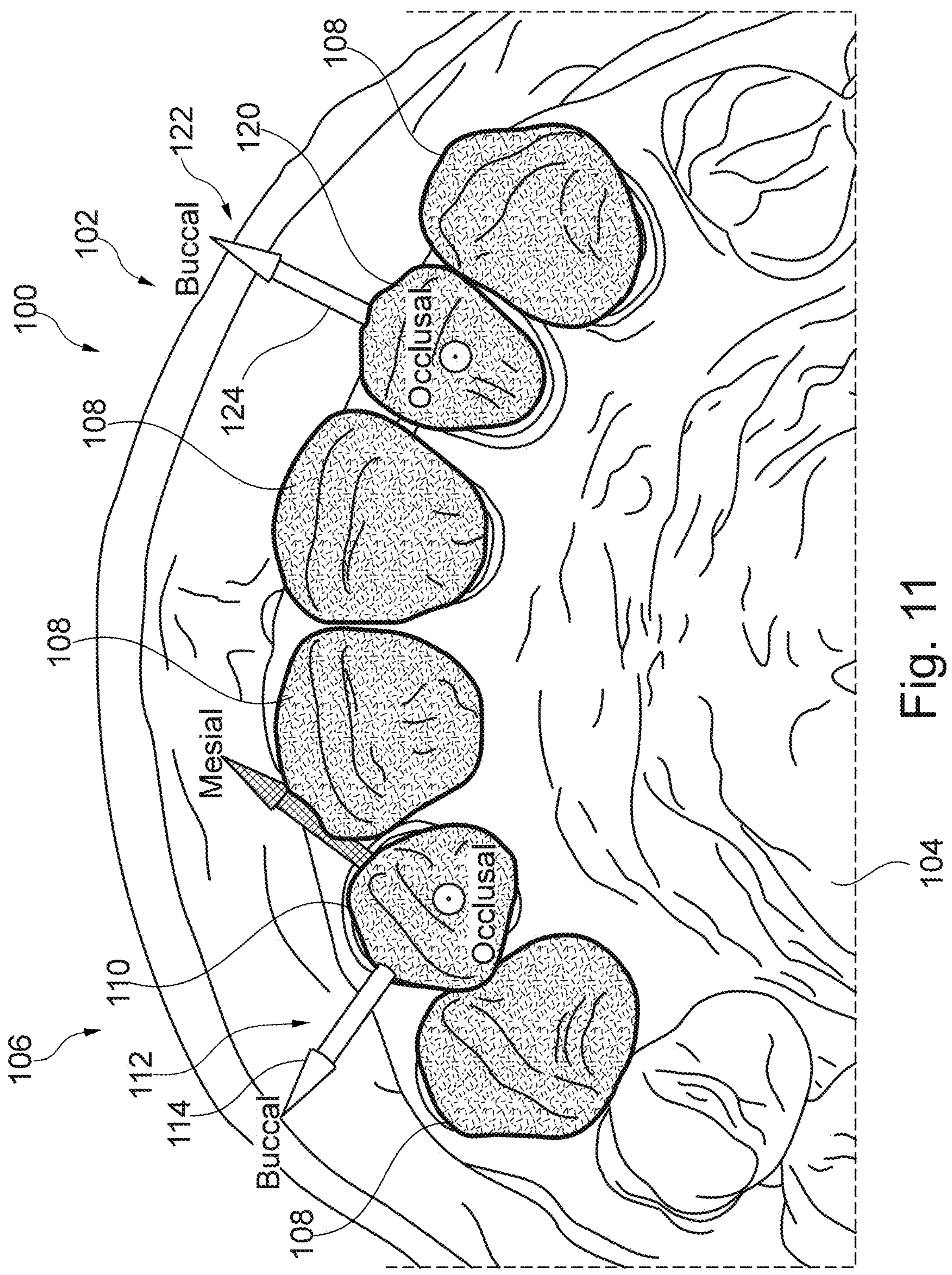
FIG. 11 shows an exemplary three-dimensional digital denture model comprising a plurality of three-dimensional digital tooth models for a dental restoration.

FIG. 11 shows the three-dimensional digital denture model 100 of FIG. 9 with the plurality of three-dimensional digital tooth models 102 arranged on the three-dimensional digital tissue model 104. Like in FIG. 9, the view depicted in FIG. 11 is a view onto the three-dimensional digital tissue model 104 and the three-dimensional digital denture model 100 in apical direction of the three-dimensional digital tooth models 102.

The three-dimensional digital denture model 100 comprises a set 106 of three-dimensional digital tooth models 102. This set 106, i.e., the three-dimensional digital tooth models 102 comprised by this set 106, may, e.g., be chosen by a set choosing input defining the set 106 of three-dimensional digital tooth models 102. In the example shown in FIG. 11, the set 106 comprises all the three-dimensional digital tooth models 102 of the three-dimensional digital denture model 100. As an alternative, the set 106 may, e.g., comprise only some of the three-dimensional digital tooth models 102 of the three-dimensional digital denture model 100.

The set 106 of three-dimensional tooth models 102 comprises the selected tooth model 110, the paired corresponding tooth model 120 as well as further remaining three-dimensional tooth models 102 of the plurality of three-dimensional digital tooth models 102. These further remaining three-dimensional tooth models 102 comprised by set 106 may be some or all the remaining three-dimensional tooth models 102 of the three-dimensional digital denture model 100.

Each of the three-dimensional tooth models 102 is assigned with a local coordinate system. The selected tooth model 110 is assigned with the local coordinate system 112, while the paired corresponding tooth models 120 is assigned with a local coordinate system 122. The selected tooth model 110 and the paired corresponding tooth model 120 are paired. This pairing may have the effect that adjustments applied to either of these models, e.g., to the selected tooth model 110 are mapped to the other model, e.g., the paired corresponding tooth model 120. When such an adjustment is mapped from one model to the other, the resulting mapped adjustment is based on a replica of the adjustment being mapped. This replica is adjusted relative to a local coordinate system of the other model, e.g., the paired corresponding tooth model 120, onto which the adjustment is mapped.

An adjustment applied to the selected tooth model 110 along a direction defined relative to its local coordinate system 112 may be mapped onto the paired corresponding tooth model 120 as a replica, which is adjusted relative to a local coordinate system 122 of the paired corresponding tooth model 120. Due to the adjustment to the local coordinate system 122 of the paired corresponding tooth model 120, the mapped adjustment may be applied in a direction defined relative to the local coordinate system 112 in the same way, as the direction of the adjustment applied to the selected tooth model 110 was defined relative to the local coordinate system 112. In case the adjustment applied to the selected tooth model 110 is applied in a direction [x, y, z] with x, y, and z being coordinate value along axes of the local coordinate system 112, the mapped adjustment applied to the paired corresponding tooth model 120 may also be applied in a direction [x, y, z] with the same coordinate values x, y, and z, but this time along axes of the local coordinate system 122.

In addition, e.g., a further calculation of set adjustments of geometric forms of the remaining three-dimensional digital tooth models 108 of the set 106 of three-dimensional digital tooth models 102 may be performed and the resulting set adjustments applied to the remaining tooth models 108. These set adjustments may, e.g., be calculated based on the adjustments of the selected three-dimensional digital tooth model 110 and the corresponding three-dimensional digital tooth models 120.

In addition, one or more of the remaining three-dimensional digital tooth models 108 of the set 106 may, e.g., be deactivated. The deactivation may, e.g., be defined by a deactivating input being received. In case one or more of the remaining three-dimensional digital tooth models 108 are deactivated, the set adjustments may not be calculated for these deactivated remaining tooth models 108, but the calculation of the set adjustments may still take into account the geometric forms of the deactivated remaining tooth models 108, i.e., the unaltered geometric forms of the deactivated remaining tooth models 108.

Figure 12:
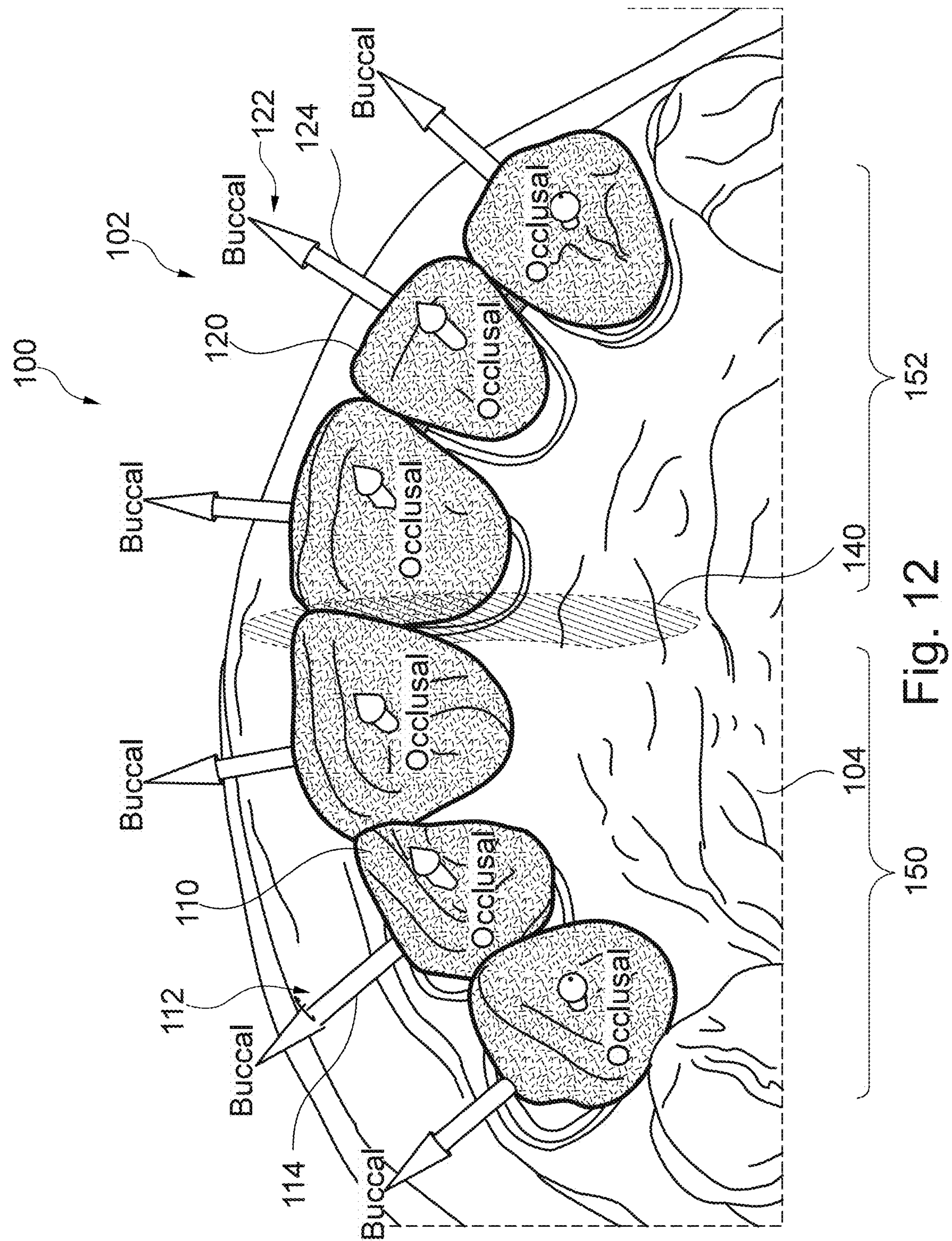
FIG. 12 shows an exemplary three-dimensional digital denture model comprising a plurality of three-dimensional digital tooth models and a global symmetry plane.

FIG. 12 shows the three-dimensional digital denture model 100 with the plurality of three-dimensional digital tooth models 102 arranged on the three-dimensional digital tissue model 104. The view depicted in FIG. 12 is a view onto the three-dimensional digital tissue model 104 and the three-dimensional digital denture model 100 in apical direction of the three-dimensional digital tooth models 102. Each of the three-dimensional digital tooth models 102 is assigned with a local coordinate system. The orientations of the local coordinate systems of the three-dimensional digital tooth models 102 relative to each other depends on the orientations of the three-dimensional digital tooth models 102 relative to each other. The plurality of three-dimensional digital tooth models 102 comprises the selected tooth model 110 with its local coordinate system 112, which is paired with the paired corresponding tooth model 120. The paired corresponding tooth models 120 comprises the local coordinate system 122.

In FIG. 12, plane of symmetry 140 is defined. The plane of symmetry 140 may, e.g., be a sagittal plane dividing the arrangement of the plurality of three-dimensional digital tooth models 102 into two halves 150 and 152. One halve 150 is arranged on one hemisphere of a jaw bow defined by the three-dimensional digital tissue model 104, while the other halve 152 be arranged symmetrically on an opposite hemisphere of the respective jaw bow. The three-dimensional digital tooth models 102 of the three-dimensional digital denture model 100 are, e.g., configured symmetrical with respect to the plane of symmetry 140. For example, positions, orientations, geometric forms, surface topologies, and/or sizes of contralateral counterpart tooth arranged on opposite sides of the plane of symmetry 140 may satisfy an exact global symmetry with respect to the plane of symmetry 140, i.e., a mirror symmetry with respect to this plane of symmetry 140.

An adjustment applied to the selected tooth model 110 along a direction defined relative to its local coordinate system 112 may be mapped onto the paired corresponding tooth model 120 as a replica, which is adjusted relative to a local coordinate system 122 of the paired corresponding tooth model 120. Due to the adjustment to the local coordinate system 122 of the paired corresponding tooth model 120, the mapped adjustment may be applied in a direction defined relative to the local coordinate system 112 in the same way, as the direction of the adjustment applied to the selected tooth model 110 was defined relative to the local coordinate system 112. In case the adjustment applied to the selected tooth model 110 is applied in a direction [x, y, z] with x, y, and z being coordinate value along axes of the local coordinate system 112, the mapped adjustment applied to the paired corresponding tooth model 120 may also be applied in a direction [x, y, z] with the same coordinate values x, y, and z, but this time along axes of the local coordinate system 122.

In general, e.g., a selected tooth model 110 and a corresponding tooth model 120 paired with the selected tooth model 110 may not satisfy such an exact global symmetry. Therefore, also adjustments mapped between the selected tooth model 110 and the paired corresponding tooth model 120 as described above may not satisfy the exact global symmetry. For example, direction [x, y, z] defined with respect to local coordinate system 112 of the selected tooth model 110 and direction [x, y, z] defined with respect to local coordinate system 122 of the paired corresponding tooth model 120 may not satisfy this exact global symmetry.

However, in case of FIG. 12, the selected tooth model 110 and the paired corresponding tooth model 120 do satisfy an exact global symmetry defined with respect to the plane of symmetry 140. In other word, the paired corresponding tooth model 120 may be a mirrored replica of the selected tooth model 110. Consequently, also the adjustments mapped between the selected tooth model 110 and the paired corresponding tooth model 120 may satisfy the exact global symmetry. For example, direction [x, y, z] defined with respect to local coordinate system 112 of the selected tooth model 110 and direction [x, y, z] defined with respect to local coordinate system 122 of the paired corresponding tooth model 120 may satisfy this exact global symmetry.

Figure 13:
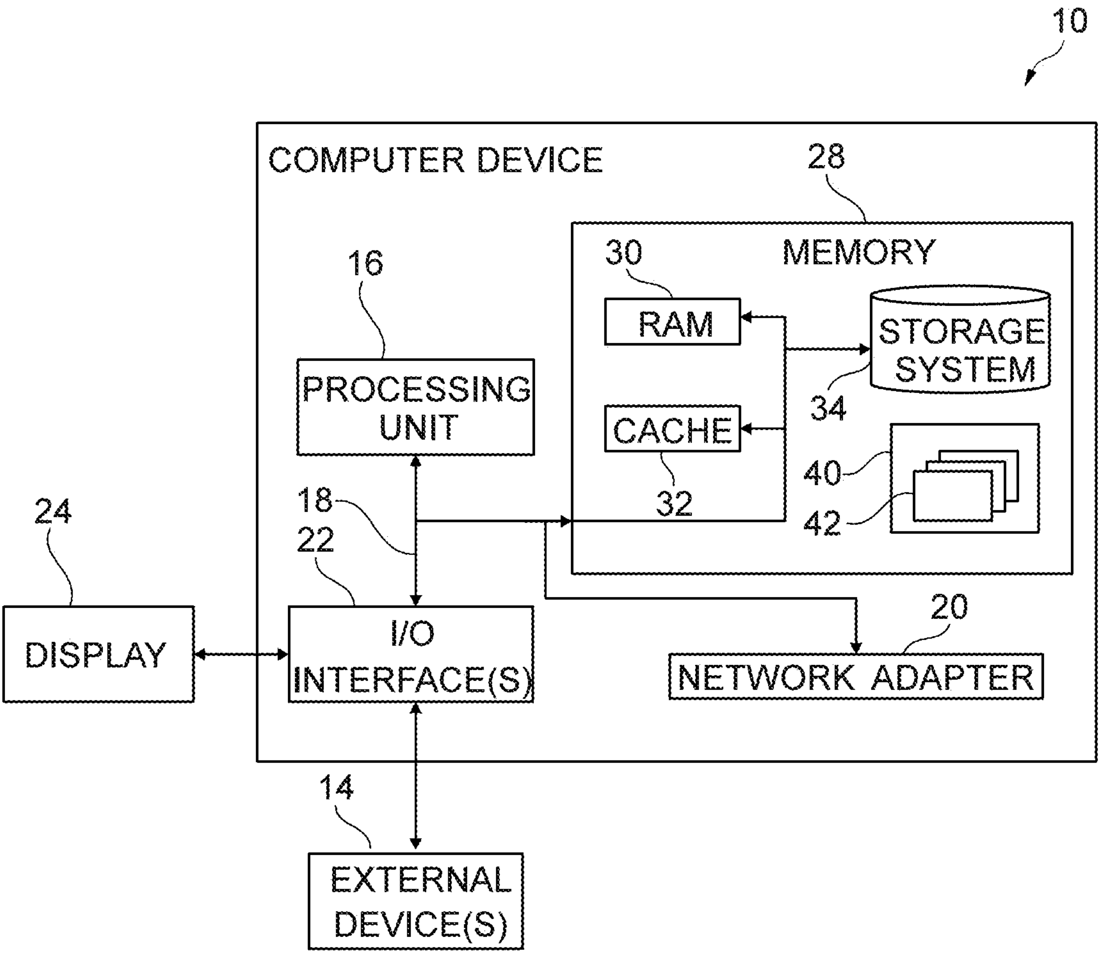
FIG. 13 shows an exemplary computer device for adjusting an arrangement of a plurality of three-dimensional digital tooth models for a dental restoration.

FIG. 13 shows a schematic diagram of an exemplary computer device 10 for adjusting an arrangement of a plurality of three-dimensional digital tooth models for a dental restoration. The computer device 10 may be operational with numerous other general-purpose or special-purpose computing system environments or configurations. Computer device 10 may be described in the general context of computer device executable instructions, such as program modules comprising executable program instructions, being executable by the computer device 10. Generally, program modules may include routines, programs, objects, components, logic, data structures, and so on that perform particular tasks or implement particular abstract data types. Computer device 10 may be practiced in distributed computing environments where tasks are performed by remote processing devices that are linked through a communications network. In a distributed computing environment, program modules may be located in both local and remote computer device storage media including memory storage devices.

In FIG. 13, computer device 10 is shown in the form of a general-purpose computing device. The components of computer device 10 may include, but are not limited to, one or more processors or processing units 16, a system memory 28, and a bus 18 that couples various system components including system memory 28 to processing unit 16. Bus 18 represents one or more of any of several types of bus structures, including a memory bus or memory controller, a peripheral bus, an accelerated graphics port, and a processing unit or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 10 may comprise a variety of computer device readable storage media. Such media may be any available storage media accessible by computer device 10, and include both volatile and non-volatile storage media, removable and non-removable storage media.

A system memory 28 may include computer device readable storage media in the form of volatile memory, such as random-access memory (RAM) 30 and/or cache memory 32. Computer device 10 may further include other removable/non-removable, volatile/non-volatile computer device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may, e.g., include a three-dimensional digital denture model comprising the plurality of the three-dimensional digital tooth models. The three-dimensional digital denture model may define an arrangement of a plurality of artificial teeth for the dental restoration. Each of the three-dimensional digital tooth models may define an individual artificial tooth of the plurality of artificial teeth. Memory 28 may, e.g., further include a three-dimensional digital tissue model defining the intraoral tissue of the patient, on which the dental restoration defined by the three-dimensional digital denture model is to be arranged.

Program 40 may have a set of one or more program modules 42 and by way of example be stored in memory 28. The program modules 42 may comprise an operating system, one or more application programs, other program modules, and/or program data. Each of these program modules 42, i.e., the operating system, the one or more application programs, the other program modules, and/or the program data or some combination thereof, may include an implementation of a networking environment. One or more of the program modules 42 may be configured for adjusting the arrangement of the plurality of three-dimensional digital tooth models for the dental restoration. The program modules 42 may, e.g., be configured to control the computer device 10 to receive the three-dimensional digital denture model comprising the plurality of the three-dimensional digital tooth models. The three-dimensional digital denture model defines the arrangement of the plurality of three-dimensional digital tooth models for the dental restoration. A first input is received selecting at least one of the three-dimensional digital tooth models. The selected three-dimensional digital tooth model is paired with a corresponding three-dimensional digital tooth model of the three-dimensional digital tooth models. A second input is received defining a modification of the selected tooth model. A first calculation is performed for calculating a first adjustment of a geometric form of the selected tooth model based on the second input, wherein the first adjustment is calculated according to a local coordinate system of the selected tooth model. The calculated first adjustment is applied to the selected tooth model. A second calculation is performed for calculating a mapped adjustment of the geometric form of the paired corresponding tooth model based on the second input or the first calculation, wherein the mapped adjustment is based on a replica of the first adjustment adjusted relative to a local coordinate system of the paired corresponding tooth model. The calculated mapped adjustment is applied to the paired corresponding tooth model. The resulting adjusted three-dimensional digital denture model is provided for manufacturing the dental restoration.

One of the program modules 42 may, e.g., further be configured for generating a three-dimensional digital dental restoration model of the dental restoration to be manufactured using the adjusted three-dimensional digital denture model provided for manufacturing the dental restoration. One of the program modules 42 may, e.g., be configured to train a machine learning module to be trained. The machine learning module to be trained may, e.g., be an untrained machine learning module, a pre-trained machine learning module or a partially trained machine learning module.

Computer device 10 may further communicate with one or more external devices 14 such as a keyboard, a pointing device, like a mouse, and a display 24 enabling a user to interact with computer device 10. Such communication can occur via input/output (I/O) interfaces 22. Computer device 10 may further communicate with one or more networks such as a local area network (LAN), a general wide area network (WAN), and/or a public network, like the Internet, via network adapter 20. Network adapter 20 may communicate with other components of computer device 10 via bus 18. It should be understood that although not shown, other hardware and/or software components could be used in conjunction with computer device 10. For example, computer device 10 may provide one or more computing functions as cloud server. For example, the computer device 10 may receive from a requesting computer device the first and/or second input for executing a cloud-based computation. For example, computer device 10 may be configured for intensive computations. The result of the cloud-based computation may be transmitted back to a requesting computer device, e.g., via a video stream. For example, computer device 10 may request as a client one or more computing functions to be executed by a cloud server. For example, the computer device 10 may send as a requesting computer device the first and/or second input to a cloud server for executing a cloud-based computation. For example, the cloud server may be configured for intensive computations. The result of the cloud-based computation may be received by computer device 10, e.g., via a video stream.

Figure 14:
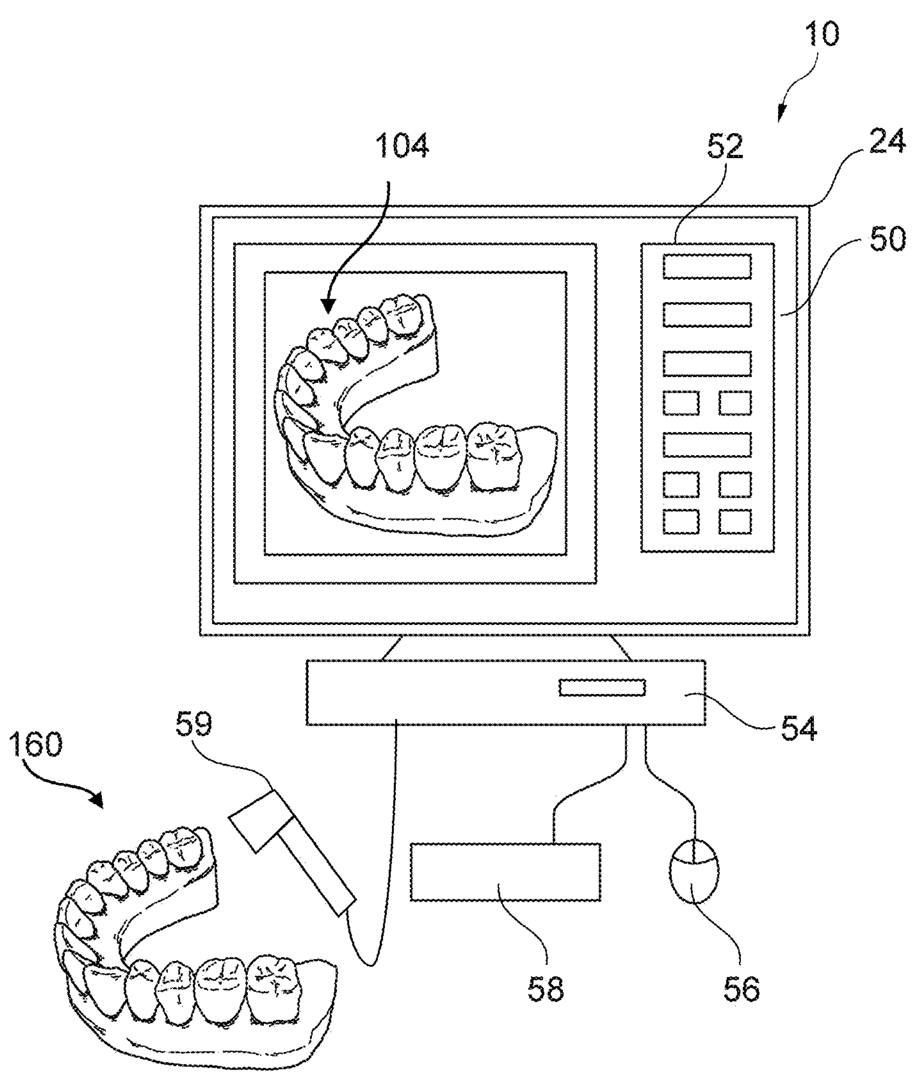
FIG. 14 shows an exemplary computer device for adjusting an arrangement of a plurality of three-dimensional digital tooth models for a dental restoration.

FIG. 14 shows an exemplary computer device 10 for adjusting an arrangement of a plurality of three-dimensional digital tooth models for a dental restoration. The computer device 10 may, e.g., be configured as shown in FIG. 13. The computer device 10 may comprise a hardware component 54 comprising one or more processing units as well as a memory storing machine-executable program instructions. Execution of the program instructions by the one or more processing units may cause the one or more processing units to control the computer device 10 to adjust an arrangement of a plurality of three-dimensional digital tooth models for a dental restoration using a first input selecting at least one of the three-dimensional digital tooth models and a second input defining a modification of the selected tooth model. The selected three-dimensional digital tooth model is paired with a corresponding three-dimensional digital tooth model of the three-dimensional digital tooth models. A first calculation is performed for calculating a first adjustment of a geometric form of the selected tooth model based on the second input, wherein the first adjustment is calculated according to a local coordinate system of the selected tooth model. The calculated first adjustment is applied to the selected tooth model. A second calculation is performed for calculating a mapped adjustment of the geometric form of the paired corresponding tooth model based on the second input or the first calculation, wherein the mapped adjustment is based on a replica of the first adjustment adjusted relative to a local coordinate system of the paired corresponding tooth model. The calculated mapped adjustment is applied to the paired corresponding tooth model. The resulting adjusted three-dimensional digital denture model is provided for manufacturing the dental restoration.

The computer device 10 may further comprise one or more input devices, like a keyboard 58 and a mouse 56, enabling a user to interact with the computer device 10. The input devices may, e.g., be configured for receiving the first input selecting at least one of the three-dimensional digital tooth models and the second input defining a modification of the selected tooth model. Furthermore, e.g., a set choosing input, which may be received before the first input, may be received defining a set of three-dimensional digital tooth models comprising the selected tooth model, a corresponding tooth model and remaining three-dimensional tooth models of the plurality of three-dimensional digital tooth models. Furthermore, e.g., a deactivating input may be received deactivating input deactivates one of the remaining tooth models.

Furthermore, the computer device 10 may comprise one or more output devices, like a display 24 providing a graphical user interface 50 with control elements 52, e.g., GUI elements, enabling the user to control the adjusting of the arrangement of a plurality of three-dimensional digital tooth models for the dental restoration. For example, the three-dimensional digital denture model comprising the plurality of the three-dimensional digital tooth models may be displayed on display 24. Furthermore, e.g., a three-dimensional digital tissue model may be displayed, on which the three-dimensional digital denture model is arranged. In addition, providing the resulting adjusted three-dimensional digital denture model may, e.g., comprise displaying the adjusted three-dimensional digital denture model on display 24.

The computer device 10 may further comprise an exemplary scanner 59 configured for scanning a patient's mouth and/or imprints of the patient's intraoral tissue. The scanner 59 may, e.g., comprise an optical scanner configured for scanning, e.g., a patient's oral cavity, an imprint of a patient's oral cavity and/or a positive of a patient's oral cavity generated using an imprint. For example, the scanner may be configured for scanning intraoral tissue 160 within a patient's oral cavity comprising intraoral tissue. The intraoral tissue being scanned may, e.g., comprise hard and/or soft tissue. Hard tissue may, e.g., comprise teeth, while soft tissue may, e.g., comprise gingiva tissue. The intraoral tissue being scanned may, e.g., comprise one or more jaws of the patient, i.e., a mandible and/or a maxilla. A jaw being scanned may, e.g., be an edentulous jaw or a jaw comprising one or more teeth. The jaw being scanned may, e.g., comprise a full dental arch. Alternatively, scanner 59 may be configured for scanning an imprint of the intraoral tissue and/or a positive of the intraoral tissue generated using an imprint. The scan data acquired using the scanner 59 may, e.g., be used for generating the three-dimensional digital tissue model 104.

Figure 15:
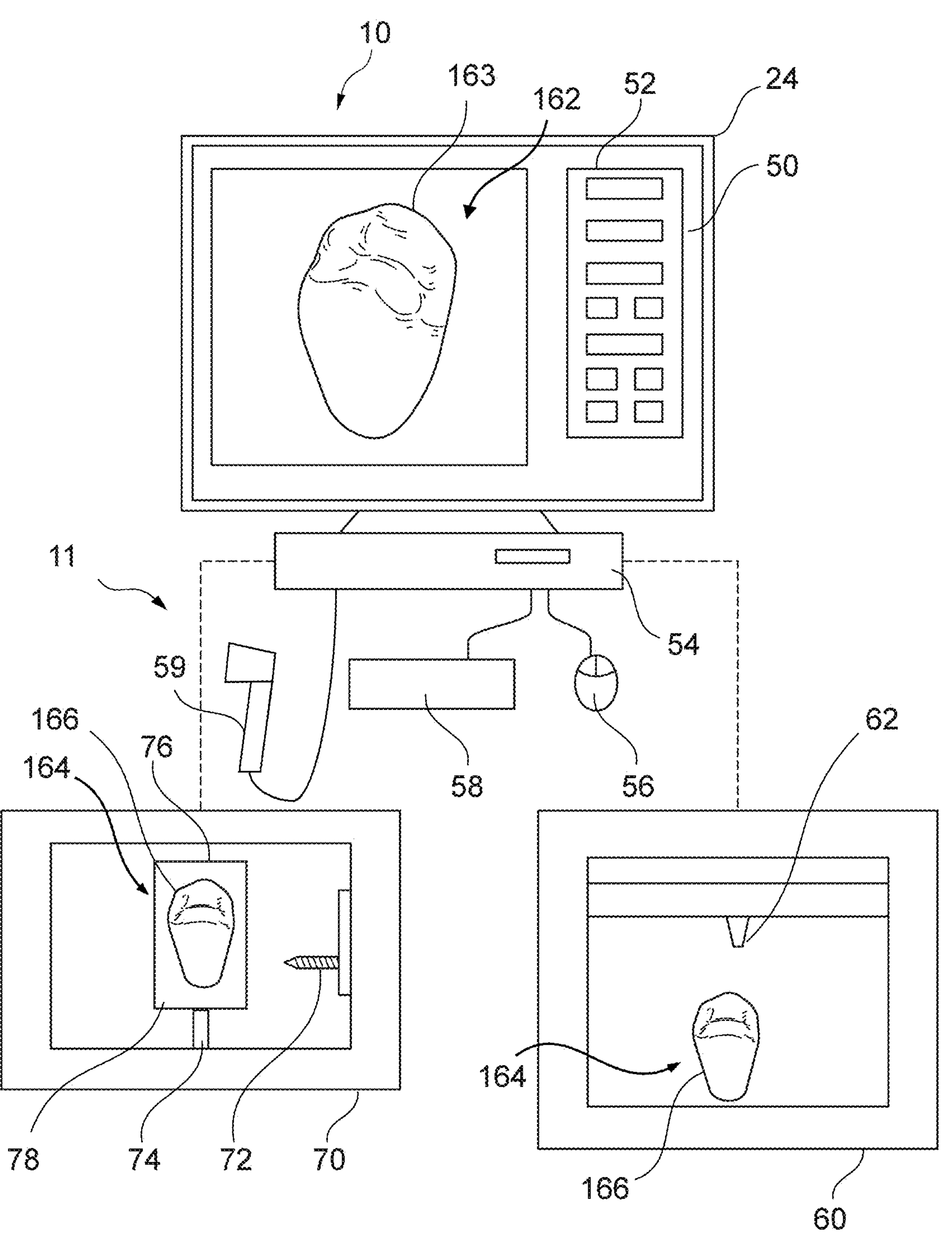
FIG. 15 shows an exemplary system for manufacturing a dental restoration using an adjusted three-dimensional digital denture model.

FIG. 15 shows an exemplary manufacturing system 11 for manufacturing a dental restoration 164 or at least one or more elements 166 of a dental restoration 164. A three-dimensional digital dental restoration model 162 comprising one or more three-dimensional digital restoration elements 163 defining one or more elements 166 of the dental restoration 164, like e.g., a physical artificial tooth, may be provided. This three-dimensional digital dental restoration model 162 may, e.g., be used as a template for manufacturing the dental restoration 164 and/or one or more dental restoration elements 166, e.g., one or more physical artificial teeth, as a physical copy of the template. For generating the dental restoration model 164 comprising the one or more dental restoration elements 163, e.g., the adjusted three-dimensional digital denture model may be used.

The manufacturing system 11 may comprise the computer device 10 of FIG. 13 and/or FIG. 14. The computer device 10 may further be configured to control one or more manufacturing devices 60, 70. For example, the manufacturing system 11 may comprise a manufacturing device in form of a machining device 70 controlled by the computer device 10. The machining device 70 may be configured to machining a blank 76 using one or more machining tools 72. The blank 76 of raw material 78, may be provided using a holding device 74 and cut into a desired shape and size of the element to be manufactured, e.g., a physical artificial tooth, as an element 166 of the dental restoration 164 as defined by the three-dimensional digital dental restoration model 162. The machining tool 72 may, e.g., be a milling tool.

For example, the manufacturing system 11 may comprise a manufacturing device in form of a 3D printing device 60. The 3D printing device 60 may be controlled by the computer device 10 and configured to print an element to be manufactured, e.g., a physical artificial tooth, as an element 166 of the dental restoration 164 as defined by the three-dimensional digital dental restoration model 162. The 3D printing device 60 may comprise a printing element 62 configured to print the respective element 166, like a physical artificial tooth, layer by layer. The printing element 62 may, e.g., comprise a nozzle configured for distributing printing material.

In case the element to be manufactured using the 3D printing device 60 is made using metal, the 3D printing device 60 may, e.g., be configured for executing selective laser sintering or melting. Selective laser sintering uses a laser for sintering a powdered material, aiming the laser automatically at points in space defined by a three-dimensional digital model of the element to be printed. The laser energy may result in a local sintering or melting of the powdered material, binding the material together to create a solid structure. For example, the printing element 62 of the 3D printing device 60 may comprise a laser and/or a distributing device for distributing the powdered material.

For example, the three-dimensional digital dental restoration model 162 may be used as a positive to define a negative of the physical dental restoration 164 and/or of one or more dental restoration elements 166, e.g., one or more physical artificial teeth, in form of a negative three-dimensional digital dental restoration model and/or of one or more negative three-dimensional digital dental restoration element models, respectively. The negative three-dimensional digital dental restoration model and/or one or more negative three-dimensional digital dental restoration element models may be used to manufacture, e.g., using machining device 70 or 3D printing device 60, one or more casting matrices. The one or more casting matrices may, e.g., be configured for casting the dental restoration 164 and/or one or more dental restoration elements 166, like a physical artificial tooth, by inserting restoration material into the casting matrix and curing the inserted restoration material.

While the invention has been illustrated and described in detail in the drawings and foregoing description, such illustration and description are to be considered illustrative or exemplary and not restrictive; the invention is not limited to the disclosed embodiments.

While the invention has been illustrated and described in detail in the drawings and foregoing description, such illustration and description are to be considered illustrative or exemplary and not restrictive; the invention is not limited to the disclosed examples.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. For example, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. For example, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer device or distributed amongst multiple computer devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computer device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Although the invention may have been described in reference to specific examples, it should be understood that the invention is not limited to these examples only and that many variations of these examples may be readily envisioned by the skilled person after having read the present disclosure. The invention may thus further be described without limitation and by way of example only by the following embodiments. The following exemplary embodiments may contain preferred embodiments. Accordingly, the term "feature combination" as used therein may refer to such a "preferred embodiment".

1. A computer-implemented method for adjusting an arrangement of a plurality of three-dimensional digital tooth models for a dental restoration, the method comprising:
   - receiving a three-dimensional digital denture model comprising the plurality of the three-dimensional digital tooth models, the three-dimensional digital denture model defining the arrangement of the plurality of three-dimensional digital tooth models for the dental restoration,
   - receiving a first input selecting at least one of the three-dimensional digital tooth models,
   - pairing the selected three-dimensional digital tooth model with a corresponding three-dimensional digital tooth model of the three-dimensional digital tooth models,
   - receiving a second input defining a modification of the selected tooth model,
   - performing a first calculation of a first adjustment of a geometric form of the selected tooth model based on the second input, wherein the first adjustment is calculated according to a local coordinate system of the selected tooth model,
   - applying the calculated first adjustment to the selected tooth model,
   - performing a second calculation of a mapped adjustment of the geometric form of the paired corresponding tooth model based on the second input or the first calculation, wherein the mapped adjustment is based on a replica of the first adjustment adjusted relative to a local coordinate system of the paired corresponding tooth model,
   - applying the calculated mapped adjustment to the paired corresponding tooth model,
   - providing the resulting adjusted three-dimensional digital denture model for manufacturing the dental restoration.

2. The method according to feature combination 1, the second calculation being based on the second input, and wherein the calculated first adjustment and the calculated mapped adjustment are applied simultaneously and/or computed simultaneously.

3. The method according to any one of feature combination 1 or 2, the selected tooth model being a model of a specific dental type, the paired corresponding tooth model being a model of the same specific dental type, the specific dental type being one of the following: incisors, canines, premolars, and molars.

4. The method according to any one of feature combinations 1-3, the paired corresponding tooth model being a contralateral counterpart of the selected tooth model or an antagonist of the selected tooth model.

5. The method according to any one of the preceding feature combinations, the local coordinate systems of the selected tooth model and the paired corresponding tooth model being orthogonal coordinate systems, in particular defined by respective axes corresponding to mesial, buccal, and occlusal directions of the tooth models.

6. The method according to any one of the preceding feature combinations, the first adjustment and the mapped adjustment including one or more of the following types of adjustment: translation, rotation, scaling, deformation, and altering of a surface topology.

7. The method according to any one of the preceding feature combinations, calculating the mapped adjustment involving determining a corresponding point on a surface of the paired corresponding tooth model that correlates to a first point on a surface of the selected tooth model where the first adjustment is to be applied, wherein the mapped adjustment is applied at the corresponding point.

8. The method according to feature combination 6, determining the corresponding point involving a computational technique selected from a group comprising: a ray intersection, a closest point determination, an interpolation, a surface mapping algorithm, and a three-dimensional coordinate transformation.

9. The method according to any one of feature combinations 7 or 8, the second input defining a geometric shape, the geometric shape having an orientation and a spatial position in relation to the local coordinate system of the selected tooth model, the second input further defining a modification of the topology within a designated zone of the selected tooth model's surface, the designated zone being defined by the geometric shape, the first point being inside the designated zone, the determining of the corresponding point being based on adjusting the orientation and the spatial position of the geometric shape relative to the coordinate system of the paired corresponding tooth model.

10. The method according to any one of the preceding feature combinations, the geometric forms being defined by meshes, wherein the adjustments of the geometric forms of the tooth models involve modifications of at least one vertex, edge, or face of the respective meshes.

11. The method according to any one of the preceding feature combinations, the geometric forms being defined by point clouds, wherein the adjustments of the geometric forms of the tooth models involve changing the position of at least one point of the respective point cloud.

12. The method according to any one of the preceding feature combinations, the scale of the paired corresponding tooth model being adjusted to match the scale of the selected tooth model before the second calculation is performed.

13. The method according to any one of the preceding feature combinations, the method further comprising for a set of three-dimensional tooth models, the set of three-dimensional tooth models comprising the selected tooth model, the paired corresponding tooth model and remaining three-dimensional tooth models of the plurality of three-dimensional digital tooth models:
   - performing a third calculation of set adjustments of the geometric forms of the remaining three-dimensional digital tooth models, wherein the set adjustments are calculated based on the first and the second calculation,
   - applying the calculated set adjustments to the remaining tooth models.

14. The method according to feature combination 13, the method further comprising:
   - receiving a set choosing input before the first input, the set choosing input defining the set of three-dimensional digital tooth models.

15. The method according to feature combination 13 or 14, the method further comprising:
   - receiving a deactivating input, wherein the deactivating input deactivates one of the remaining tooth models, wherein the set adjustments are not calculated for the deactivated remaining tooth models, and wherein the third calculation is also based on a geometric form of the deactivated remaining tooth model.

16. The method according to any one of the preceding feature combinations, the method further comprising:

pairing the selected digital tooth model also with an additional three-dimensional digital tooth model of the three-dimensional digital tooth models, performing a fourth calculation of an additional mapped adjustment of a geometric form of the additional tooth model based on the second input or the first calculation, wherein the additional mapped adjustment is based on an additional replica of the first adjustment adjusted relative to the local coordinate system of the additional tooth model, applying the calculated additional mapped adjustment to the additional tooth model.

17. The method according to any one of the preceding feature combinations, the paired corresponding tooth model being a mirrored replica of the selected tooth model, the mirroring being in particular performed with respect to a mirror plane provided by a sagittal plane dividing the arrangement of the plurality of three-dimensional digital tooth models into two halves or provided by an occlusal plane.

18. The method according to any one of the preceding feature combinations, the local coordinate system of the paired corresponding tooth model and the local coordinate system of the selected tooth model satisfying a mirror symmetry with respect to the mirror plane provided by the sagittal plane dividing the arrangement of the plurality of three-dimensional digital tooth models into two halves or provided by the occlusal plane.

19. The method according to any one of the feature combinations 1 to 16, selectively only one of the following features of the local coordinate system of the paired corresponding tooth model and the local coordinate system of the selected tooth model satisfying the mirror symmetry with respect to the mirror plane provided by the sagittal plane dividing the arrangement of the plurality of three-dimensional digital tooth models into two halves or provided by the occlusal plane: a scale, a position, an orientation.

20. A computer program product for adjusting an arrangement of a plurality of three-dimensional digital tooth models for a dental restoration, the computer program product comprising a computer readable storage medium having program instructions embodied therewith, the program instructions being executable by a processor of a computer device to cause the computer device to:

receive a three-dimensional digital denture model comprising the plurality of the three-dimensional digital tooth models, the three-dimensional digital denture model defining the arrangement of the plurality of three-dimensional digital tooth models for the dental restoration, receive a first input selecting at least one of the three-dimensional digital tooth models, pair the selected three-dimensional digital tooth model with a corresponding three-dimensional digital tooth model of the three-dimensional digital tooth models, receive a second input defining a modification of the selected tooth model, perform a first calculation of a first adjustment of a geometric form of the selected tooth model based on the second input, wherein the first adjustment is calculated according to a local coordinate system of the selected tooth model, apply the calculated first adjustment to the selected tooth model, perform a second calculation of a mapped adjustment of the geometric form of the paired corresponding tooth model based on the second input or the first calculation, wherein the mapped adjustment is based on a replica of the first adjustment adjusted relative to a local coordinate system of the paired corresponding tooth model, apply the calculated mapped adjustment to the paired corresponding tooth model, provide the resulting adjusted three-dimensional digital denture model for manufacturing the dental restoration.

21. A computer program for adjusting an arrangement of a plurality of three-dimensional digital tooth models for a dental restoration, the computer program comprising program instructions being executable by a processor of a computer device to cause the computer device to:

receive a three-dimensional digital denture model comprising the plurality of the three-dimensional digital tooth models, the three-dimensional digital denture model defining the arrangement of the plurality of three-dimensional digital tooth models for the dental restoration, receive a first input selecting at least one of the three-dimensional digital tooth models, pair the selected three-dimensional digital tooth model with a corresponding three-dimensional digital tooth model of the three-dimensional digital tooth models, receive a second input defining a modification of the selected tooth model, perform a first calculation of a first adjustment of a geometric form of the selected tooth model based on the second input, wherein the first adjustment is calculated according to a local coordinate system of the selected tooth model, apply the calculated first adjustment to the selected tooth model, perform a second calculation of a mapped adjustment of the geometric form of the paired corresponding tooth model based on the second input or the first calculation, wherein the mapped adjustment is based on a replica of the first adjustment adjusted relative to a local coordinate system of the paired corresponding tooth model, apply the calculated mapped adjustment to the paired corresponding tooth model, provide the resulting adjusted three-dimensional digital denture model for manufacturing the dental restoration.

22. A computer device for adjusting an arrangement of a plurality of three-dimensional digital tooth models for a dental restoration, the computer device comprising a processor and a memory storing program instructions executable by the processor, execution of the program instructions by the processor causing the computer device to:

receive a three-dimensional digital denture model comprising the plurality of the three-dimensional digital tooth models, the three-dimensional digital denture model defining the arrangement of the plurality of three-dimensional digital tooth models for the dental restoration, receive a first input selecting at least one of the three-dimensional digital tooth models, pair the selected three-dimensional digital tooth model with a corresponding three-dimensional digital tooth model of the three-dimensional digital tooth models, receive a second input defining a modification of the selected tooth model, perform a first calculation of a first adjustment of a geometric form of the selected tooth model based on the second input, wherein the first adjustment is calculated according to a local coordinate system of the selected tooth model, apply the calculated first adjustment to the selected tooth model, perform a second calculation of a mapped adjustment of the geometric form of the paired corresponding tooth model based on the second input or the first calculation, wherein the mapped adjustment is based on a replica of the first adjustment adjusted relative to a local coordinate system of the paired corresponding tooth model, apply the calculated mapped adjustment to the paired corresponding tooth model, provide the resulting adjusted three-dimensional digital denture model for manufacturing the dental restoration.

23. A manufacturing system comprising the computer device of feature combination 22, the manufacturing system further comprising one or more manufacturing devices configured for manufacturing a dental restoration, execution of the program instructions by the processor further causing the computer device to generate a three-dimensional digital dental restoration model of the dental restoration to be manufactured using the adjusted three-dimensional digital denture model provided for manufacturing the dental restoration, execution of the program instructions by the processor further causing the computer device to control the one or more manufacturing devices to manufacture the dental restoration using the three-dimensional digital dental restoration model as a template, the manufactured dental restoration being a physical copy of the template.

REFERENCE SIGNS LIST

10 computer device
11 manufacturing system
14 external device
16 processing unit
18 bus
20 network adapter
22 I/O interface
24 display
28 memory
30 RAM
32 cache
34 storage system
40 program
42 program module
50 user interface
52 control elements
54 hardware device
56 keyboard
58 mouse
59 scanner
60 3D printing device
62 printing element
70 machining device
72 machining tool
74 holding device
76 blank
78 raw material
100 3D digital denture model
102 plurality of 3D digital tooth models
104 3D digital tissue model
106 set of 3D digital tooth models
108 remaining 3D digital tooth models
110 selected tooth model
112 local coordinate system
114 coordinate axes
116 coordinate axes
118 coordinate axes
120 corresponding tooth model
122 local coordinate system
130 global coordinate system
140 mirror plane
142 plane
150 first half
152 second half
160 intraoral tissue
162 3D digital dental restoration model
163 3D digital restoration element
164 dental restoration
166 dental restoration element

The invention claimed is:

1. A computer-implemented method for adjusting an arrangement of a plurality of three-dimensional digital tooth models within a three-dimensional digital denture model for a dental restoration, the method comprising:

receiving the three-dimensional digital denture model comprising the plurality of the three-dimensional digital tooth models, the three-dimensional digital denture model defining the arrangement of the plurality of three-dimensional digital tooth models for the dental restoration, receiving a first input selecting at least one of the three-dimensional digital tooth models within the three-dimensional digital denture model, pairing the selected three-dimensional digital tooth model with a corresponding three-dimensional digital tooth model of the three-dimensional digital tooth models within the three-dimensional digital denture model, receiving a second input defining a modification of the selected tooth model, performing a first calculation of a first adjustment of a geometric form of the selected tooth model based on the second input, wherein the first adjustment is calculated according to a local coordinate system of the selected tooth model, applying the calculated first adjustment to the selected tooth model within the three-dimensional digital denture model, performing a second calculation of a mapped adjustment of the geometric form of the paired corresponding tooth model within the three-dimensional digital denture model based on the second input or the first calculation, wherein the mapped adjustment is based on a replica of the first adjustment adjusted relative to a local coordinate system of the paired corresponding tooth model, applying the calculated mapped adjustment to the paired corresponding tooth model within the three-dimensional digital denture model, providing the resulting adjusted three-dimensional digital denture model for manufacturing the dental restoration.

2. The method according to claim 1, the second calculation being based on the second input, and wherein the calculated first adjustment and the calculated mapped adjustment are applied simultaneously and/or computed simultaneously.

3. The method according to claim 1, the selected tooth model being a model of a specific dental type, the paired corresponding tooth model being a model of the same specific dental type, the specific dental type being one of the following: incisors, canines, premolars, and molars.

4. The method according to claim 1, the paired corresponding tooth model being a contralateral counterpart of the selected tooth model or an antagonist of the selected tooth model.

5. The method according to claim 1, the local coordinate systems of the selected tooth model and the paired corresponding tooth model being orthogonal coordinate systems, in particular defined by respective axes corresponding to mesial, buccal, and occlusal directions of the tooth models.

6. The method according to claim 1, the first adjustment and the mapped adjustment including one or more of the following types of adjustment: translation, rotation, scaling, deformation, and altering of a surface topology.

7. The method according to claim 6, determining the corresponding point involving a computational technique selected from a group comprising: a ray intersection, a closest point determination, an interpolation, a surface mapping algorithm, and a three-dimensional coordinate transformation.

8. The method according to claim 1, calculating the mapped adjustment involving determining a corresponding point on a surface of the paired corresponding tooth model that correlates to a first point on a surface of the selected tooth model where the first adjustment is to be applied, wherein the mapped adjustment is applied at the corresponding point.

9. The method according to claim 8, the second input defining a geometric shape, the geometric shape having an orientation and a spatial position in relation to the local coordinate system of the selected tooth model, the second input further defining a modification of the topology within a designated zone of the selected tooth model's surface, the designated zone being defined by the geometric shape, the first point being inside the designated zone, the determining of the corresponding point being based on adjusting the orientation and the spatial position of the geometric shape relative to the coordinate system of the paired corresponding tooth model.

10. The method according to claim 1, the geometric forms being defined by meshes, wherein the adjustments of the geometric forms of the tooth models involve modifications of at least one vertex, edge, or face of the respective meshes.

11. The method according to claim 1, the geometric forms being defined by point clouds, wherein the adjustments of the geometric forms of the tooth models involve changing the position of at least one point of the respective point cloud.

12. The method according to claim 1, the scale of the paired corresponding tooth model being adjusted to match the scale of the selected tooth model before the second calculation is performed.

13. The method according to claim 1, the method further comprising for a set of three-dimensional tooth models, the set of three-dimensional tooth models comprising the selected tooth model, the paired corresponding tooth model and remaining three-dimensional tooth models of the plurality of three-dimensional digital tooth models:

performing a third calculation of set adjustments of the geometric forms of the remaining three-dimensional digital tooth models, wherein the set adjustments are calculated based on the first and the second calculation, applying the calculated set adjustments to the remaining tooth models.

14. The method according to claim 13, the method further comprising:

receiving a set choosing input before the first input, the set choosing input defining the set of three-dimensional digital tooth models.

15. The method according to claim 13, the method further comprising:

receiving a deactivating input, wherein the deactivating input deactivates one of the remaining tooth models, wherein the set adjustments are not calculated for the deactivated remaining tooth models, and wherein the third calculation is also based on a geometric form of the deactivated remaining tooth model.

16. The method according to claim 1, the method further comprising:

pairing the selected digital tooth model also with an additional three-dimensional digital tooth model of the three-dimensional digital tooth models, performing a fourth calculation of an additional mapped adjustment of a geometric form of the additional tooth model based on the second input or the first calculation, wherein the additional mapped adjustment is based on an additional replica of the first adjustment adjusted relative to the local coordinate system of the additional tooth model, applying the calculated additional mapped adjustment to the additional tooth model.

17. The method according to claim 1, the local coordinate system of the paired corresponding tooth model and the local coordinate system of the selected tooth model satisfying a mirror symmetry with respect to a mirror plane provided by a sagittal plane dividing the arrangement of the plurality of three-dimensional digital tooth models into two halves or provided by an occlusal plane.

18. A computer program product for adjusting an arrangement of a plurality of three-dimensional digital tooth models within the three-dimensional digital denture model for a dental restoration, the computer program product comprising a non-transitory computer readable storage medium having program instructions embodied therewith, the program instructions being executable by a processor of a computer device to cause the computer device to:

receive the three-dimensional digital denture model comprising the plurality of the three-dimensional digital tooth models, the three-dimensional digital denture model defining the arrangement of the plurality of three-dimensional digital tooth models for the dental restoration, receive a first input selecting at least one of the three-dimensional digital tooth models within the three-dimensional digital denture model, pair the selected three-dimensional digital tooth model with a corresponding three-dimensional digital tooth model of the three-dimensional digital tooth models within the three-dimensional digital denture model, receive a second input defining a modification of the selected tooth model, perform a first calculation of a first adjustment of a geometric form of the selected tooth model based on the second input, wherein the first adjustment is calculated according to a local coordinate system of the selected tooth model, apply the calculated first adjustment to the selected tooth model within the three-dimensional digital denture model, perform a second calculation of a mapped adjustment of the geometric form of the paired corresponding tooth model within the three-dimensional digital denture model based on the second input or the first calculation, wherein the mapped adjustment is based on a replica of the first adjustment adjusted relative to a local coordinate system of the paired corresponding tooth model, apply the calculated mapped adjustment to the paired corresponding tooth model within the three-dimensional digital denture model, provide the resulting adjusted three-dimensional digital denture model for manufacturing the dental restoration.

19. A computer device for adjusting an arrangement of a plurality of three-dimensional digital tooth models within the three-dimensional digital denture model for a dental restoration, the computer device comprising a processor and a memory storing program instructions executable by the processor, execution of the program instructions by the processor causing the computer device to:

receive the three-dimensional digital denture model comprising the plurality of the three-dimensional digital tooth models, the three-dimensional digital denture model defining the arrangement of the plurality of three-dimensional digital tooth models for the dental restoration, receive a first input selecting at least one of the three-dimensional digital tooth models within the three-dimensional digital denture model, pair the selected three-dimensional digital tooth model with a corresponding three-dimensional digital tooth model of the three-dimensional digital tooth models within the three-dimensional digital denture model, receive a second input defining a modification of the selected tooth model, perform a first calculation of a first adjustment of a geometric form of the selected tooth model based on the second input, wherein the first adjustment is calculated according to a local coordinate system of the selected tooth model, apply the calculated first adjustment to the selected tooth model within the three-dimensional digital denture model, perform a second calculation of a mapped adjustment of the geometric form of the paired corresponding tooth model within the three-dimensional digital denture model based on the second input or the first calculation, wherein the mapped adjustment is based on a replica of the first adjustment adjusted relative to a local coordinate system of the paired corresponding tooth model, apply the calculated mapped adjustment to the paired corresponding tooth model within the three-dimensional digital denture model, provide the resulting adjusted three-dimensional digital denture model for manufacturing the dental restoration.

20. A manufacturing system comprising the computer device of claim 19, the manufacturing system further comprising one or more manufacturing devices configured for manufacturing a dental restoration, execution of the program instructions by the processor further causing the computer device to generate a three-dimensional digital dental restoration model of the dental restoration to be manufactured using the adjusted three-dimensional digital denture model provided for manufacturing the dental restoration, execution of the program instructions by the processor further causing the computer device to control the one or more manufacturing devices to manufacture the dental restoration using the three-dimensional digital dental restoration model as a template, the manufactured dental restoration being a physical copy of the template.

* * * * *